United States Patent
Weihs et al.

(10) Patent No.: US 9,248,685 B2
(45) Date of Patent: Feb. 2, 2016

(54) PRINT MEDIUM

(71) Applicant: Omya International AG, Oftringen (CH)

(72) Inventors: Jan Philipp Weihs, Düdingen (CH); Oliver Patrick Grossmann, Lostorf (CH); Matthias Buri, Rothrist (CH); Philipp Hunziker, Böckten (CH); Patrick A. C. Gane, Rothrist (CH); Daniel Gantenbein, Elnesvagen (NO)

(73) Assignee: Omya International AG, Oftringen (CH)

( * ) Notice: Subject to any disclaimer, the term of this patent is extended or adjusted under 35 U.S.C. 154(b) by 0 days.

(21) Appl. No.: 14/424,078

(22) PCT Filed: Sep. 19, 2013

(86) PCT No.: PCT/EP2013/069525
§ 371 (c)(1),
(2) Date: Feb. 26, 2015

(87) PCT Pub. No.: WO2014/044778
PCT Pub. Date: Mar. 27, 2014

(65) Prior Publication Data
US 2015/0210103 A1    Jul. 30, 2015

Related U.S. Application Data

(60) Provisional application No. 61/704,615, filed on Sep. 24, 2012.

(30) Foreign Application Priority Data

Sep. 20, 2012   (EP) ..................................... 12185246

(51) Int. Cl.
*B41N 1/04*      (2006.01)
*C08K 7/22*      (2006.01)
(Continued)

(52) U.S. Cl.
CPC . *B41N 1/04* (2013.01); *C04B 26/02* (2013.01); *C04B 38/0051* (2013.01); *C08K 7/22* (2013.01); *D21H 19/38* (2013.01); *D21H 21/52* (2013.01);
(Continued)

(58) Field of Classification Search
None
See application file for complete search history.

(56) References Cited

U.S. PATENT DOCUMENTS

| 5,229,168 A | 7/1993 | Richard et al. |
| 9,145,484 B2 * | 9/2015 | Gane ...................... C04B 14/28 |
| 2008/0282026 A1 | 11/2008 | Selker et al. |

FOREIGN PATENT DOCUMENTS

| EP | 2465903 A1 | 6/2012 |
| TW | 201229145 A | 7/2012 |

(Continued)

OTHER PUBLICATIONS

European Search Report dated Dec. 7, 2012 for Application No. EP 12185246.1.
International Preliminary Report on Patentability dated Mar. 24, 2015 for PCT Application No. PCT/EP2013/069525.
Office Action for Taiwanese Application No. 102133361.
International Search Report dated Nov. 12, 2013 for PCT Application No. PCT/EP/2013/069525.
(Continued)

*Primary Examiner* — Joshua D Zimmerman
(74) *Attorney, Agent, or Firm* — Amster, Rothstein & Ebenstein LLP

(57) ABSTRACT

The present invention concerns a print medium and a method of producing such a print medium. In particular, the present invention is directed to a print medium comprising a substrate having a first and a reverse side, and at least one coating layer on of the substrate sides.

54 Claims, 6 Drawing Sheets

(51) Int. Cl.
*D21H 19/38* (2006.01)
*D21H 21/52* (2006.01)
*C04B 26/02* (2006.01)
*C04B 38/00* (2006.01)
*C09C 1/02* (2006.01)

(52) U.S. Cl.
CPC ......... *C01P 2004/51* (2013.01); *C01P 2004/52* (2013.01); *C01P 2004/53* (2013.01); *C01P 2004/61* (2013.01); *C01P 2004/62* (2013.01); *C01P 2006/12* (2013.01); *C01P 2006/14* (2013.01); *C01P 2006/17* (2013.01); *C09C 1/021* (2013.01)

(56) References Cited

FOREIGN PATENT DOCUMENTS

| | | |
|---|---|---|
| WO | 2009009553 A1 | 1/2009 |
| WO | 2009052960 A2 | 4/2009 |

OTHER PUBLICATIONS

Written Opinion of the International Searching Authority dated Nov. 12, 2013 for PCT Application No. PCT/EP/2013/069525.

* cited by examiner

PRINT MEDIUM

CROSS-REFERENCE TO RELATED APPLICATIONS

This application is a U.S. national phase of PCT Application No. PCT/EP2013/069525, filed Sep. 19, 2013, which claims priority to European Application No. 12185246.1, filed Sep. 20, 2012 and U.S. Provisional Application No. 61/704,615, filed Sep. 24, 2012.

The present invention relates to the field of printing, and more specifically to a print medium, a method for producing such a print medium, and a composition for producing a coating layer for a print medium.

Flexography is a printing technique which utilizes flexible relief plates. It is essentially a modern version of a letterpress technique which can be used for printing on almost any type of substrate, including plastic, metallic films, cellophane, and paper. Generally, a flexographic print is made by creating a positive mirrored master of the required image as a three-dimensional relief, for example, in a rubber or polymer material. The ink, which can be a water-based, is transferred from an ink chamber to a so-called anilox roll (or meter roll) whose texture holds a specific amount of ink since it is covered with thousands of small cells that enable it to meter ink to the printing plate in a uniform thickness evenly and quickly. A metal scraper, called a doctor blade, removes excess ink from the anilox roller before inking the printing plates. The substrate is finally fed between plate and impression cylinder to transfer the image. In those cases where subsequent process steps (like polychrome printing, punching, dye cutting, creasing etc.) require a dry surface, drying steps can be included.

In contrast to other printing techniques such as rotogravure or offset printing, flexography typically uses much higher amounts of ink, depending on the total amount of colors. This can lead to problems during the printing process, especially in case of polychrome printing applications. To reproduce the final image typically multiple layers of ink are essential. This process usually requires immobilized ink before the next printing or converting step is applied to the substrate. Furthermore, the use of water-based inks becomes increasingly relevant in flexography in order to eliminate pollution produced by organic solvents. Such water-based inks, however, require a substrate which is capable of absorbing the ink solvent very quickly, since water-based inks have the tendency to bleed, run, and smudge. It is also typical in post-print wet-on-wet-inline flexography that the printed substrates are immediately further processed to the final print product, e.g. by die cutting, creasing, folding, or gluing, without in between drying steps.

Currently, flexographic paper based print media are produced which remain either uncoated, but have a recycled or white fiber top layer, or are coated by a white pigment layer. These print media are known in the art as schrenz, testliner, white top liner or white top testliner. The uncoated substrates can be printed without intermediate drying between each printing unit. However, these uncoated substrates have a matt surface, and, thus, do not allow the production of glossy high quality prints. The coated substrates, which are able to provide glossy prints, however, require an intermediate drying step between each printing unit since the ink is not absorbed sufficiently fast. Without an intermediate drying step, a smearing of the ink in the next printing unit, the conveyor belts, and the processing facilities would be caused without varnishing.

EP 2 395 148 A1 describes a process of producing a lined paper comprising an application layer having a specific pore structure. A process for coating papers at pH 4 to 5 with a cross-linked anionic polymer, and the use of such papers in flexographic printing is disclosed in U.S. Pat. No. 5,229,168 B1. US 2008/0282026 A1 relates to a linerboard with a porous coating composition for printing applications. A mineral composition, especially for use in paper fillers and paper or plastic coatings, is described in EP 2 465 903 A1.

However, there remains a need in the art for a print medium which is suitable for flexography, and allows the reproduction of prints with good quality at high productivity.

Accordingly, it is an object of the present invention to provide a print medium that is suitable for flexography, preferably wet-on-wet and/or post-print flexography, and significantly reduces the problems of the prior art. It is desirable to provide a print medium which absorbs the transferred ink sufficiently fast, and, thus, can be used in printing applications, for example, in pre-print or post-print flexography, without requiring any intermediate drying steps. It is also desirable to provide a print medium which can be used in flexography at the same speeds like uncoated white top liner without smearing and smudging, and thus, allows high productivity. It is also desirable to provide a print medium which is capable of absorbing high amounts of ink, in particular flexographic ink, without a smearing on subsequent processing units.

It is also an object of the present invention to provide a print medium that can replace uncoated substrates in printing applications, especially in flexographic printing applications, without changing the machine setup of the printing system.

It is also an object of the present invention to provide a print medium with improved sheet gloss, print gloss and brightness, which allows the production of high quality prints, especially high quality flexographic prints.

The foregoing and other objects are solved by a print medium comprising a substrate having a first and a reverse side, wherein the substrate comprises at least on the first side at least one permeable coating layer comprising pigment particles, wherein said pigment particles, when in form of a compacted bed, have a monomodal pore diameter distribution, a volume defined polydispersity expressed as full width at half maximum height (FWHM) from 36 to 80 nm, and a volume defined median pore diameter from 30 to 80 nm.

According to another aspect of the present invention, a method for producing a print medium is provided, the method comprising the steps of:

a) providing a substrate having a first side and a reverse side, and b) applying a coating composition comprising pigment particles and at least one coating binder on the first side of the substrate to form a permeable coating layer, wherein said pigment particles, when in form of a compacted bed, have a monomodal pore diameter distribution, a volume defined polydispersity expressed as full width at half maximum height (FWHM) from 36 to 80 nm, and a volume defined median pore diameter from 30 to 80 nm.

According to still another aspect of the present invention, a composition comprising pigment particles is provided, wherein said pigment particles, when in form of a compacted bed, have a monomodal pore diameter distribution, a volume defined polydispersity expressed as full width at half maximum height (FWHM) from 36 to 80 nm, and a volume defined median pore diameter from 30 to 80 nm.

According to still another aspect of the present invention, the use of a composition comprising pigment particles in a printing application is provided, wherein said pigment particles, when in form of a compacted bed, have a monomodal pore diameter distribution, a volume defined polydispersity expressed as full width at half maximum height (FWHM) from 36 to 80 nm, and a volume defined median pore diameter from 30 to 80 nm.

Advantageous embodiments of the present invention are defined in the corresponding sub-claims.

According to one embodiment the substrate is selected from paper, cardboard, containerboard, plastic, cellophane, textile, wood, metal, or concrete, preferably paper, cardboard, or containerboard. According to another embodiment the substrate comprises at least one permeable coating layer on the first and the reverse side. According to one embodiment the substrate is structured by at least two sublayers, preferably three, five, or seven sublayers. According to another embodiment the substrate is precoated, preferably with precipitated calcium carbonate, modified calcium carbonate, or ground calcium carbonate, or mixtures thereof.

According to one embodiment the pigment particles are selected from calcium carbonate, plastic pigments such as polystyrene-based plastic pigments, titanium dioxide, dolomite, calcined clay, non-calcined (hydrous) clay, bentonite, or mixtures thereof, preferably calcium carbonate, and more preferably precipitated calcium carbonate. According to another embodiment the pigment particles, when in form of a compacted bed, have a volume defined polydispersity expressed as full width at half maximum height (FWHM) from 40 to 80 nm, preferably from 45 to 75 nm, and more preferably from 50 to 70 nm. According to still another embodiment the pigment particles, when in form of a compacted bed, have a volume defined median pore diameter from 35 to 75 nm, preferably from 40 to 70 nm.

According to one embodiment the pigment particles, when in form of a compacted bed, have an intruded total specific void volume from 0.20 to 0.50 cm³/g, preferably from 0.25 to 0.48 cm³/g, more preferably from 0.30 to 0.55 cm³/g, and most preferably from 0.35 to 0.40 cm³/g. According to another embodiment the pigment particles have a specific surface area from 10 to 30 m²/g, preferably from 15 to 25 m²/g. According to still another embodiment the pigment particles have a weight median particle size $d_{50}$ of ≤300 nm, preferably from 20 to 250 nm, more preferably from 50 to 240 nm, and most preferably from 70 to 230 nm.

According to one embodiment the coating layer further contains a coating binder, preferably in an amount from 1 to 20 wt.-%, based on the total weight of the pigment particles, preferably from 3 to 15 wt.-%, and more preferably from 6 to 12 wt.-%. According to another embodiment the coating binder is selected from starch, polyvinylalcohol, styrene-butadiene latex, styrene-acrylate latex, or polyvinyl acetate latex, or mixtures thereof, and is preferably a styrene-butadiene latex.

According to one embodiment the coating layer has a coat weight from 1 to 50 g/m², preferably from 2 to 40 g/m², more preferably from 3 to 30 g/m², and most preferably from 5 to 20 g/m². According to another embodiment the coating layer further comprises a rheology modifier in an amount of less than 1 wt.-%, based on the total weight of the pigment particles. According to still another embodiment the coating layer has a permeability of greater than $0.2 \times 10^{-17}$ m², preferably from $0.3\ 10^{-17}$ m² to $3.0 \times 10^{-17}$ m², and more preferably from $0.4\ 10^{-17}$ m² to $2.5 \times 10^{-17}$ m². According to still another embodiment the print medium is a flexographic print medium.

According to one embodiment the coating composition used in the inventive method is a liquid coating composition and the method further comprises a step c) of drying the coating layer. According to another embodiment the steps b) and c) are also carried out on the reverse side of the substrate to manufacture a print medium being coated on the first and the reverse side. According to still another embodiment the steps b) and c) are carried out a second time using a different or the same liquid coating composition.

According to one embodiment the liquid coating composition used in the inventive method to form the coating layer has a solid content from 10 to 80 wt.-%, preferably from 30 to 75 wt.-%, more preferably from 40 to 70 wt.-%, and most preferably from 45 to 65 wt.-%, based on the total weight of the liquid coating composition. According to another embodiment the liquid coating composition has a Brookfield viscosity in the range from 20 to 3000 mPa·s, preferably from 250 to 3000 mPa·s, and more preferably from 1000 to 2500 mPa·s.

According to one embodiment the coating composition used in the inventive method is a dry coating composition and step b) is also carried out on the reverse side of the substrate to manufacture a print medium being coated on the first and the reverse side. According to another embodiment the step b) is also carried out a second time using a different or the same dry coating composition.

According to one embodiment the coating composition used in the inventive method is applied by high speed coating, metering size press, curtain coating, spray coating, blade coating, or electrostatic coating.

According to one embodiment the inventive composition is a dry or liquid coating composition. According to another embodiment the printing application, in which the inventive composition is used, is a flexographic printing application, preferably the manufacture of a coated flexographic print medium.

It should be understood that for the purpose of the present invention, the following terms have the following meaning.

For the purpose of the present invention, the term "absorption rate" is a measure for the amount of liquid that can be absorbed by a coating layer within a certain time. As used herein, the absorption rate is expressed as a linear relationship between V(t)/A and √t, the gradient of which is $$\frac{d(V(t)/A)}{d\sqrt{t}} = \frac{d((m(t)/\rho)/A)}{d\sqrt{t}}$$

where m(t) is the mass uptake at time t, as defined by a volume V(t) of liquid of density ρ. The data are normalized to the cross-sectional area of the sample, A, such that the data become V(t)/A, the volume absorbed per unit cross-sectional area of the sample. The gradient can be obtained directly from the plotted data by a linear regression analysis, and gives an absorption rate of the liquid uptake. The absorption rate is specified in $ms^{-0.5}$. An apparatus that can be used to determine the absorption rate is described in Schoelkopf et al. "Measurement and network modelling of liquid permeation into compacted mineral blocks", (Journal of Colloid and Interface Science 2000, 227(1), 119-131).

The term "basis weight" as used in the present invention is determined according to DIN EN ISO 536:1996, and is defined as the weight in g/m².

The term "ink" as used in the present invention is a combination of at least one pigment, at least one ink binder, water as carrier liquid, and optionally, in respect to water, a minor amount of organic solvent. In addition the ink can optionally contain further additives that are well-known to the skilled person. For example, the ink can contain surfactants which improve the wetting of the surface or coating layer of the print medium. The term "ink binder" as used in the present invention is a compound that is used to bind together one or more pigment particles of the ink and provide their adhesion to the surface of the substrate.

The term "coating binder" as used in the present invention is a compound that is used to bind together two or more other materials in mixtures, for example, the coating pigment particles contained in a coating composition and provide for their adhesion to the surface material of a substrate.

The term "brightness" as used in the context of the present invention is a measurement of the percentage of diffuse light reflected from a substrate's surface. A brighter sheet reflects more light. As used herein, brightness of the substrate can be measured at a mean wavelength of light of 457 nm according to DIN 53145-2:2000 or ISO 2469:1994, and is specified in percent with respect to the defined standard.

For the purposes of the present invention, the term "coating" refers to one or more layers, coverings, films, skins etc., formed, created, prepared etc., from a coating composition which remains predominantly on the surface of the print medium.

For the purposes of the present invention, the term "gloss" refers to the ability of a substrate to reflect some portion of the incident light at the mirror angle. The term "sheet gloss" refers to the gloss of the unprinted substrate, while "print gloss" refers to the gloss of the printed areas of the substrate. Gloss may be based on a measurement of the quantity of light specularly reflected from the surface of a substrate at a set angle, for example, at 75°, such as in the case of 75° gloss and is specified in percent. The gloss can be determined according to EN ISO 8254-1:2003.

"Ground calcium carbonate" (GCC) in the meaning of the present invention is a calcium carbonate obtained from natural sources, such as limestone, marble, calcite, chalk or dolomite, and processed through a wet and/or dry treatment such as grinding, screening and/or fractionation, for example by a cyclone or classifier.

"Modified calcium carbonate" (MCC) in the meaning of the present invention may feature a natural ground or precipitated calcium carbonate with an internal structure modification or a surface-reaction product.

Throughout the present document, the "particle size" of a pigment particle is described by its distribution of particle sizes. The value $d_x$ represents the diameter relative to which x % by weight of the particles have diameters less than $d_x$. This means that the $d_{20}$ value is the particle size at which 20 wt.-% of all particles are smaller, and the $d_{75}$ value is the particle size at which 75 wt.-% of all particles are smaller. The $d_{50}$ value is thus the weight median particle size, i.e. 50 wt.-% of all particle grains are bigger or smaller than this particle size. For the purpose of the present invention the particle size is specified as weight median particle size $d_{50}$ unless indicated otherwise. For determining the weight median particle size $d_{50}$ value for particles having a $d_{50}$ value between 0.2 and 5 μm, a Sedigraph 5100 or 5120 device from the company Micromeritics, USA, can be used.

In the context of the present invention, the term "pore" is to be understood as describing the space that is found between the pigment particles, i.e. that is formed by the pigment particles and that allows the passage or absorption of fluids. The size of the pores can be defined by their "volume defined median pore diameter" as described below.

Also, in the context of the present invention, the term "intruded total specific void volume" is to be understood as describing the measured pore volume (that is found between the pigment particles) per unit mass of sample containing the pigment particles. The intruded total specific void volume can be measured by mercury porosimetry using a Micrometrics Autopore IV mercury porosimeter.

An exemplary mercury porosimetry experiment entails the evacuation of a porous sample to remove trapped gases, after which the sample is surrounded with mercury. The amount of mercury displaced by the sample allows calculation of the sample's bulk volume, $V_{bulk}$. Pressure is then applied to the mercury so that it intrudes into the sample through pores connected to the external surface. The maximum applied pressure of mercury can be 414 MPa, equivalent to a Laplace throat diameter of 0.004 μm. The data can be corrected using Pore-Comp (P. A. C. Gane et al. "Void Space Structure of Compressible Polymer Spheres and Consolidated Calcium Carbonate Paper-Coating Formulations", Industrial and Engineering Chemistry Research 1996, 35 (5):1753-1764) for mercury and penetrometer effects, and also for sample compression. By taking the first derivative of the cumulative intrusion curves the pore size distributions based on equivalent Laplace diameter, inevitably including pore-shielding, are revealed. The intruded total specific void volume corresponds to the void volume determined by mercury porosimetry.

The term "monomodal pore size distribution" as used herein refers to a collection of pores which have a single clearly discernable maximum on a pore size distribution curve (intensity on the ordinate or y-axis, and logarithmically arrayed pore size on the abscissa or x-axis).

In the present context the term "volume defined median pore diameter" will refer to the pore size, below which 50% of the total specific pore volume is intruded into finer than the Young-Laplace equation defined equivalent capillary diameter, where the Young-Laplace equation is applied to the mercury intrusion curve obtained, e.g. by the mercury porosimetry experiment described above. A definition of the term "volume defined median pore diameter" can be found in Ridgway et al. "Modified calcium carbonate coatings with rapid absorption and extensive liquid uptake capacity" (Colloids and Surfaces A: Physiochem. and Eng. Asp. 2004, 236 (1-3), 91-102).

The term "volume defined pore size polydispersity" is to be understood as a characteristic describing the breadth of distribution of pore size diameters to be found between the pigment particles. For the purpose of the present invention the volume defined pore size polydispersity is expressed as full width at half maximum of the single pore size distribution peak. A "full width at half maximum (FWHM)" is an expression of the extent of a function, given by the difference between the two extreme values of the independent variable at which the dependent variable is equal to half of its maximum value. The technical term full width at half maximum, or FWHM, is used to approximate the diameter distribution of the majority of the pores, i.e. the polydispersity of the pore sizes.

The term "optical print density" as used in the context of the present invention is a measure of the extent to which a printed area transmits the selected filtered light. The optical density is a dimension for the thickness distributed concentration of the colour layer above the substrate. The optical print density can be measured according to DIN 16527-3: 1993-11, using a Spectrophotometer SpectroDens from Techkon, Königstein, Germany.

A "pigment" in the meaning of the present invention can be a mineral pigment or a synthetic pigment. For the purpose of the present invention, a "mineral pigment" is a solid substance having a definite inorganic chemical composition and characteristic crystalline and/or amorphous structure, while an organic "synthetic pigment" is, e.g., a plastic pigment based on a polymer.

For the purpose of the present invention, the monomodal pore diameter distribution, the volume defined polydispersity expressed as FWHM, volume defined median pore diameter, and the intruded total specific void volume of the pigment or the coating composition are determined, when the pigment or the coating composition is in form of a compacted bed, i.e. in form of a tablet formulation. A detailed description for preparing a compacted bed or tablet formulation from pigment suspensions or slurries or coating composition can be found in Ridgway et al. "Modified calcium carbonate coatings with rapid absorption and extensive liquid uptake capacity" (Colloids and Surfaces A: Physiochem. and Eng. Asp. 2004, 236 (1-3), 91-102).

For the purpose of the present invention, the term "permeability" refers to the ease with which a liquid can flow through a tablet of the coating composition or coating layer. As used herein, the permeability is expressed in terms of the Darcy permeability constant, k, as $$\frac{dV(t)}{dt} = \frac{-kA\Delta P}{\eta l}$$

where $dV(t)/dt$ is defined as the flux or volume flow rate per unit cross-sectional area, A, $\Delta P$ is the applied pressure difference across the sample, $\eta$ is the viscosity of the liquid and l is the length of the sample. The data are reported in terms of k in $m^2$. A detailed description for a permeability measurement method can be found in Ridgway et al. "A new method for measuring the liquid permeability of coated and uncoated papers and boards" (Nordic Pulp and Paper Research Journal 2003, 18(4), 377-381).

A "permeable" coating layer in the meaning of the present invention refers to a coating layer that is capable of absorbing ink, which has been applied to said coating layer. Preferably, a permeable coating layer has a permeability of greater than $0.2 \times 10^{-17}$ $m^2$.

"Precipitated calcium carbonate" (PCC) in the meaning of the present invention is an inorganic synthesized material, generally obtained by precipitation following a reaction of carbon dioxide and calcium hydroxide (hydrated lime) in an aqueous environment or by precipitation of a calcium and a carbonate source in water. Additionally, precipitated calcium carbonate can also be the product of introducing calcium and carbonate salts, calcium chloride and sodium carbonate for example, in an aqueous environment.

For the purposes of the present invention, a "rheology modifier" is an additive that changes the rheological behavior of a slurry or liquid coating composition to match the required specifications for the coating method employed.

A "specific surface area (SSA)" of a mineral pigment in the meaning of the present invention is defined as the surface area of the mineral pigment divided by the mass of the mineral pigment. As used herein, the specific surface area is measured by adsorption using the BET isotherm (ISO 9277:2010), and is specified in $m^2/g$.

A "suspension" or "slurry" in the meaning of the present invention comprises insoluble solids and water, and optionally further additives, and usually contains large amounts of solids and, thus, is more viscous and can be of higher density than the liquid from which it is formed.

In the present context the term "substrate" is to be understood as any material having a surface suitable for printing or painting on, such as paper, cardboard, containerboard, plastic, cellophane, textile, wood, metal, or concrete.

For the purposes of the present invention, the "thickness" of a layer refers to the thickness of a layer after the applied coating composition forming the layer has been dried.

For the purposes of the present invention, the term "viscosity" with reference to liquid coating compositions, refers to Brookfield viscosity. The Brookfield viscosity may be measured by a Brookfield viscometer at 23° C. at 100 rpm and is specified in mPa·s.

For the purposes of the present invention, the term "viscosity" with reference to printing inks, refers to the DIN 4 mm viscosity cup. The measured viscosity of the DIN 4 mm cup characterizes the time in seconds a defined volume of ink needs to run through the 4 mm nozzle of said cup as described in DIN EN ISO 2341-2012-03.

For the purpose of the present invention, the term "preprint" refers to a printing application, preferably a flexographic printing application, wherein the facing paper of a print product comprising a one layered substrate is printed separately and subsequently is assembled to the multilayer product, such as e.g. the final corrugated board, e.g., by gluing and/or die cutting.

"Post-print" in the meaning of the present invention, refers to a printing application, preferably a flexographic printing application, wherein a substrate is printed, which represents already the final print product (substrate). For example, a substrate comprising at least two or three sublayers such as a corrugated board can be printed in a post-print process.

An "inline process" in the meaning of the present invention, refers to a printing application, preferably a flexographic printing application, in which a printing machine is used, wherein all color stations and optionally further post-press production steps are placed in series, especially horizontally in series.

In the present context, the term "wet-on-wet" refers to a polychrome printing application, preferably a polychrome flexographic printing application, wherein the individual colors are printed subsequently on the substrate without any in-between drying.

Where the term "comprising" is used in the present description and claims, it does not exclude other elements. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This means that, unless the context clearly dictates otherwise, the term "obtained" does not mean to indicate that an embodiment must be obtained by, e.g. the sequence of steps following the term "obtained" even though such a limited understanding is always included by the terms "obtained" or "defined" as a preferred embodiment.

The inventive print medium comprises a substrate having a first and a reverse side. The substrate comprises at least on the first side at least one permeable coating layer comprising pigment particles, wherein said pigment particles, when in form of a compacted bed, have a monomodal pore diameter distribution, a volume defined polydispersity expressed as full width at half maximum height (FWHM) from 36 to 80 nm, and a volume defined median pore diameter from 30 to 80 nm. Optionally, the print medium can further comprise at least one permeable coating layer on the reverse side of the substrate. Preferably, the print medium is a flexographic print medium.

In the following, the details and preferred embodiments of the inventive print medium will be set out in more detail. It is to be understood that these technical details and embodiments also apply to the inventive method for producing said print-medium, the inventive composition and its use.

Substrate

The print medium of the present invention comprises a substrate having a first and a reverse side. The substrate can serve as a support for the permeable coating layer and may be opaque, translucent, or transparent.

According to one embodiment of the present invention, the substrate is selected from paper, cardboard, containerboard, plastic, cellophane, textile, wood, metal, or concrete.

According to a preferred embodiment of the present invention, the substrate is paper, cardboard, or containerboard. Cardboard may comprise carton board or boxboard, corrugated cardboard, or non-packaging cardboard such as chromoboard, or drawing cardboard. Containerboard may encompass linerboard and/or a corrugating medium. Both linerboard and a corrugating medium are used to produce corrugated board. The paper, cardboard, or containerboard substrate can have a basis weight from 10 to 1000 g/m$^2$, from 20 to 800 g/m$^2$, from 30 to 700 g/m$^2$, or from 50 to 600 g/m$^2$.

According to another embodiment, the substrate is a plastic substrate. Suitable plastic materials are, for example, polyethylene, polypropylene, polyvinylchloride, polyesters, polycarbonate resins or fluorine-containing resins. Examples for suitable polyesters are poly(ethylene terephthalate), poly(ethylene naphthalate) or poly(ester diacetate). An example for a fluorine-containing resins is poly(tetrafluoro ethylene). The plastic substrate may be filled by a mineral filler, an organic pigment, an inorganic pigment, or mixtures thereof.

The substrate may consist of only one layer of the above-mentioned materials or may comprise a layer structure having several sublayers of the same material or different materials. According to one embodiment, the substrate is structured by one layer. According to another embodiment the substrate is structured by at least two sublayers, preferably three, five, or seven sublayers. Preferably the sublayers of the substrate are made from paper, cardboard, containerboard and/or plastic.

According to one exemplary embodiment, the substrate is structured by two sublayers comprising a flat sublayer and a sublayer having a non-flat structure, e.g. a corrugated structure. According to another exemplary embodiment, the substrate is structured by three sublayers comprising two flat outer sublayers and an intermediate sublayer having a non-flat structure, e.g. a corrugated structure. According to another exemplary embodiment, the substrate is structured by five sublayers comprising two flat outer sublayers, a flat intermediate sublayer, and between the outer sublayer and the intermediate sublayer two sublayers having a non-flat structure, e.g. a corrugated structure. According to still another embodiment, the substrate is structured by seven sublayers comprising two flat outer sublayers, two flat intermediate sublayers, and three sublayers having a non-flat structure, e.g. a corrugated structure, wherein two non-flat sublayers are between the outer sublayer and the intermediate sublayers, and one non-flat sublayer is between the two intermediate sublayers. However, the substrate of the print medium according to the present invention may also comprise any other suitable single or multilayer structure.

A print medium comprising a substrate consisting of only one layer can be subjected to a flexographic pre-print process, wherein the print medium is printed and subsequently assembled into a product comprising at least two sublayers, wherein the substrate is used as an outer sublayer of said product. For example, such a pre-printed print medium can be used as outside liner of a corrugated fiber board or cardboard. In this case such a pre-printed print medium would represent the outer sublayer(s) (2) and/or (4) of the layer structures shown in FIGS. 2, 3, and 4.

A substrate that is subjected to a flexographic pre-print process can have a thickness from 0.04 to 10 mm, from 0.06 to 1 mm, or from 0.05 to 0.5 mm. According to a preferred embodiment, the substrate has a thickness from 0.1 to 0.3 mm.

The opposite of the pre-print process is the flexographic post-print process, wherein a print medium comprising a substrate that is structured by at least two sublayers is printed. It is advantageous to combine post-printing in an inline printing process with post-press production steps such as folding or cutting of the print medium.

According to one embodiment, the substrate is pre-coated, preferably with a carbonate, and more preferably with a calcium carbonate, and most preferably with a precipitated calcium carbonate, modified calcium carbonate or ground calcium carbonate, or mixtures thereof. Such a pre-coat may improve the optical print density and the print gloss of the inventive print medium.

Pigment Particles

The permeable coating layer of the inventive print medium comprises pigment particles, which, when in form of a compacted bed, have a monomodal pore diameter distribution, a volume defined polydispersity expressed as full width at half maximum height (FWHM) from 36 to 80 nm, and a volume defined median pore diameter from 30 to 80 nm.

The inventors surprisingly found that the speed of the ink-absorption during printing applications, especially during flexography, can be increased if the substrate is coated with a layer comprising the inventive pigment particles with the above-defined properties. Furthermore, the retention of the ink molecules on the surface of the substrate can be improved by coating the substrate with a layer comprising the inventive pigment particles which in turn leads to a higher optical print density. The sheet and print gloss of the substrate can also be improved. In particular, the inventors found that, especially in flexographic printing applications, one can obtain a better control of the absorption speed of the ink solvents through the inventive pigment particles composition when utilizing a monomodal pore diameter distribution. Without being bound to any theory, it is also believed that better control of the speed of the ink absorption is obtained by a uniform pore size expressed by the above-defined volume defined polydispersity range.

According to one embodiment of the present invention, said pigment particles, when in form of a compacted bed, have a volume defined polydispersity expressed as full width at half maximum height (FWHM) from 40 to 80 nm, preferably from 45 to 75 nm, and more preferably from 50 to 70 nm.

According to one embodiment of the present invention, the pigment particles, when in form of a compacted bed, have a volume defined median pore diameter from 35 to 75 nm, preferably from 40 to 70 nm.

According to another embodiment of the present invention, the pigment particles, when in form of a compacted bed, have an intruded total specific void volume from 0.20 to 0.50

$cm^3/g$, preferably from 0.25 to 0.48 $cm^3/g$, more preferably from 0.30 to 0.45 $cm^3/g$, and most preferably from 0.35 to 0.40 $cm^3/g$.

The pigment particles can have a specific surface area from 10 to 30 $m^2/g$, preferably from 15 to 25 $m^2/g$.

According to one embodiment of the present invention, the pigment particles have a weight median particle size $d_{50}$ of ≤300 nm, preferably from 20 to 250 nm, more preferably from 50 to 240 nm, and most preferably from 70 to 230 nm. Preferably, the weight median particle size $d_{50}$ is measured using a Sedigraph 5120 from the company Micromeritics, USA. The inventors surprisingly found that a weight median particle size $d_{50}$ between 20 and 300 nm, and in particular between 50 and 250 nm, can further improve the absorptive properties of the inventive pigment particles and can provide improved paper and print gloss.

According to one embodiment of the present invention, the pigment particles are mineral pigment particles. A suitable mineral pigment may be a calcium carbonate, for example, in the form of a ground calcium carbonate, a modified calcium carbonate or a precipitated calcium carbonate, or a mixture thereof. A natural ground calcium carbonate (GCC) may feature, e.g., one or more of marble, limestone, chalk, and/or dolomite. A precipitated calcium carbonate (PCC) may feature, e.g., one or more of aragonitic, vateritic and/or calcitic mineralogical crystal forms. Aragonite is commonly in the acicular form, whereas vaterite belongs to the hexagonal crystal system. Calcite can form scalenohedral, prismatic, spherical, and rhombohedral forms. A modified calcium carbonate may feature a natural ground or precipitated calcium carbonate with a surface and/or internal structure modification, e.g., the calcium carbonate may be treated or coated with a hydrophobising surface treatment agent such as, e.g. an aliphatic carboxylic acid or a siloxane. Calcium carbonate may be treated or coated to become cationic or anionic with, for example, a polyacrylate or polydiallyldimethylammonium chloride (polyDADMAC).

Preferably the mineral pigment is a ground calcium carbonate, a modified calcium carbonate, or a precipitated calcium carbonate, or a mixture thereof. According to an especially preferred embodiment, the mineral pigment is a precipitated calcium carbonate. The inventors surprisingly found that coating layers comprising precipitated calcium carbonate may result in very good coverage of the substrate and a very good opacity. Furthermore, precipitated calcium carbonate can be produced in very narrow monomodal particle size distributions.

According to one embodiment, the calcium carbonate will be derived from an aqueous suspension of calcium carbonate. According to one embodiment of the present invention, the aqueous suspension of calcium carbonate has a solid content of between 10 wt.-% and 82 wt.-%, preferably between 50 wt.-% and 81 wt.-%, and more preferably between 50 wt.-% and 78 wt.-%, based on the total weight of the aqueous suspension of calcium carbonate. According to one preferred embodiment of the present invention, the aqueous suspension of calcium carbonate is a concentrated aqueous suspension of dispersed calcium carbonate, which preferably has a solid content between 50 wt.-% and 78 wt.-%, based on the total weight of the aqueous suspension of calcium carbonate.

In addition to calcium carbonate, the coating layer can comprise further mineral pigments or synthetic pigments. Examples for further pigment particles comprise silica, alumina, titanium dioxide, clay, calcined clays, barium sulfate, or zinc oxide. Examples of synthetic pigments include plastic pigments, such as styrene pigments (e.g. Ropaque™ AF-1353, commercially available from Dow Chemical).

However, instead of calcium carbonate, the pigment particles can be selected from any other pigment particles, which, when in form of a compacted bed, have a monomodal pore diameter distribution, a volume defined polydispersity expressed as full width at half maximum height (FWHM) from 36 to 80 nm, and a volume defined median pore diameter from 30 to 80 nm.

According to an exemplary embodiment of the present invention, the pigment particles are selected from calcium carbonate, plastic pigments such as polystyrene-based plastic pigments, titanium dioxide, dolomite, calcined clay, non-calcined (hydrous) clay, bentonite, or mixtures thereof, preferably calcium carbonate, more preferably precipitated calcium carbonate.

According to a further aspect of the present invention, a composition comprising pigment particles is provided, wherein said pigment particles, when in form of a compacted bed form, have a monomodal pore diameter distribution, a volume defined polydispersity expressed as full width at half maximum height (FWHM) from 36 to 80 nm, and a volume defined median pore diameter from 30 to 80 nm.

According to one embodiment of the present invention, the composition is a liquid or dry coating composition.

According to a preferred embodiment of the present invention, the pigment particles are selected from precipitated calcium carbonate, wherein said pigment particles, when in form of a compacted bed, have a volume defined polydispersity expressed as full width at half maximum height (FWHM) from 45 to 75 nm, preferably from 50 to 70 nm, and/or a volume defined median pore diameter from 35 to 75 nm, preferably from 40 to 70 nm, and/or an intruded total specific void volume from 0.20 to 0.50 $cm^3/g$, preferably from 0.25 to 0.48 $cm^3/g$, and/or a weight median particle size $d_{50}$ of 300 nm, preferably from 20 to 250 nm.

According to still another aspect of the present invention, the use of a composition comprising pigment particles in printing applications is provided, wherein said pigment particles, when in form of a compacted bed, have a monomodal pore diameter distribution, and a volume defined polydispersity expressed as full width at half maximum height (FWHM) from 36 to 80 nm.

According to one embodiment, the printing application is a flexographic printing application. A flexographic printing application can be, for example, the manufacture of a coated flexographic print medium, wherein preferably the flexographic print medium is selected from paper, cardboard, containerboard, plastic, cellophane, textile, wood, metal or concrete, preferably paper, cardboard, or containerboard.

However, the composition of the present invention may also be used in other printing applications, such as offset printing, or inkjet printing.

Coating Layer

The substrate comprises at least on the first side at least one permeable coating layer comprising pigment particles. The function of the permeable coating layer is to absorb and to transport ink solvent which is applied to the print medium in course of the printing process towards the substrate and to retain the pigment particles of the ink.

The ink compositions used in flexography are typically liquid compositions comprising a solvent or carrier liquid, dyes or pigments, humectants, organic solvents, detergents, thickeners, preservatives, and the like. Preferably the solvent or carrier liquid is water-based, i.e. the amount of water in the solvent or carrier liquid is greater than the amount of organic solvents and/or volatile organic compounds contained therein. In contrast to inks containing mainly organic solvents and/or volatile organic compounds, water-based inks may encounter fewer environmental concerns.

Depending on the composition of the coating layer of the inventive print medium, the printing ink may require further additives such as surfactants, which ensure sufficient wetting of the coating layer. Alternatively or additionally, the coating layer of the inventive print medium can be composed such that sufficient wetting is ensured. The skilled person knows how to suitably select such ink compositions and/or coating layer compositions.

According to the present invention, the coating layer of the inventive print medium is permeable. According to one embodiment of the present invention, the coating layer has a permeability of greater than $0.2 \times 10^{-7}$ $m^2$, preferably from $0.3$ $10^{-7}$ $m^2$ to $3.0 \times 10^{-17}$ $m^2$, and more preferably from $0.4$ $10^{-17}$ $m^2$ to $2.5 \times 10^{-17}$ $m^2$.

The coating layer has preferably an absorption rate of at least $1.0 \times 10^{-7}$ $ms^{-0.5}$, preferably from $1.0 \times 10^{-7}$ $ms^{-0.5}$ to $1.0 \times 10^{-2}$ $ms^{-0.5}$, more preferably from $1.0 \times 10^{-6}$ $ms^{-0.5}$ to $5.0 \times 10^{-3}$ $ms^{-0.5}$, and most preferably from $1.0 \times 10^{-5}$ $ms^{-0.5}$ to $2.5 \times 10^{-3}$ $ms^{-0.5}$. The liquid used to determine the absorption rate is hexadecane.

According to an exemplary embodiment of the present invention, the coating layer has a permeability of greater than $0.2 \times 10^{-17}$ $m^2$ and an absorption rate of at least $1.0 \times 10^{-7}$ $ms^{-0.5}$, preferably the coating layer has a permeability from $0.3$ $10^{-7}$ $m^2$ to $3.0 \times 10^{-17}$ $m^2$ and an absorption rate from $1.0 \times 10^{-7}$ $ms^{0.5}$ to $1.0 \times 10^{-2}$ $ms^{-0.5}$.

The amount of the pigment in the coating layer can range from 40 to 99 wt.-%, e.g., from 45 to 98 w.-%, preferably from 60 to 97 wt.-%, based on the total weight of the coating layer.

The coating layer can further contain a coating binder. Any suitable polymeric binder may be used in the coating layer of the invention. For example, the polymeric binder may be a hydrophilic polymer such as, for example, poly(vinyl alcohol), poly(vinyl pyrrolidone), gelatin, cellulose ethers, poly(oxazolines), poly(vinylacetamides), partially hydrolyzed poly(vinyl acetate/vinyl alcohol), poly(acrylic acid), poly(acrylamide), poly(alkylene oxide), sulfonated or phosphated polyesters and polystyrenes, casein, zein, albumin, chitin, chitosan, dextran, pectin, collagen derivatives, collodian, agar-agar, arrowroot, guar, carrageenan, starch, tragacanth, xanthan, or rhamsan and mixtures thereof. It is also possible to use other binders such as hydrophobic materials, for example, poly(styrene-co-butadiene), polyurethane latex, polyester latex, poly(n-butyl acrylate), poly(n-butyl methacrylate), poly(2-ethylhexyl acrylate), copolymers of n-butylacrylate and ethylacrylate, copolymers of vinylacetate and n-butylacrylate, and the like.

According to one embodiment, the coating binder is a natural binder selected from starch. According to another embodiment, the coating binder is a synthetic binder selected from styrene-butadiene latex, styrene-acrylate latex, or polyvinyl acetate latex. The coating layer can also contain mixtures of hydrophilic and latex binders, for example, a mixture of polyvinyl alcohol and styrene-butadiene latex.

According to an exemplary embodiment of the present invention, the coating binder is selected from starch, polyvinylalcohol, styrene-butadiene latex, styrene-acrylate latex, or polyvinyl acetate latex, or mixtures thereof, and is preferably a styrene-butadiene latex. An example of a styrene-butadiene latex is Litex 9460, commercially available from the company Synthomer.

According to one embodiment of the present invention, the amount of coating binder in the coating layer is from 1 to 20 wt.-%, based on the total weight of the pigment particles, preferably from 3 to 15 wt.-%, and more preferably from 6 to 12 wt.-%.

The coating layer may contain further, optional additives. Suitable additives can comprise, for example, dispersants, milling aids, surfactants, rheology modifiers, lubricants, defoamers, optical brighteners, dyes, preservatives, or pH controlling agents. According to one embodiment, the coating layer further comprises a rheology modifier. Preferably the rheology modifier is present in an amount of less than 1 wt.-%, based on the total weight of the pigment particles.

According to an exemplary embodiment, the pigment is dispersed with a dispersant. The dispersant may be used in an amount from 0.01 to 10 wt.-%, 0.05 to 8 wt.-%, 0.5 to 5 wt.-%, 0.8 to 3 wt.-%, or 1.0 to 1.5 wt.-%, based on the total weight of the pigment particles. In a preferred embodiment, the pigment is dispersed with an amount of 0.05 to 5 wt.-%, and preferably with an amount of 0.5 to 5 wt.-% of a dispersant, based on the total weight of the pigment particles. As suitable dispersant is preferably selected from the group comprising homopolymers or copolymers of polycarboxylic acid salts based on, for example, acrylic acid, methacrylic acid, maleic acid, fumaric acid or itaconic acid and acrylamide or mixtures thereof. Homopolymers or copolymers of acrylic acid are especially preferred. The molecular weight $M_w$ of such products is preferably in the range of 2 000-15 000 g/mol, with a molecular weight $M_w$ of 3 000-7 000 g/mol being especially preferred. The molecular weight $M_w$ of such products is also preferably in the range of 2 000 to 150 000 g/mol, and an $M_w$ of 15 000 to 50 000 g/mol is especially preferred, e.g., 35 000 to 45 000 g/mol. According to an exemplary embodiment, the dispersant is polyacrylate.

The molecular weight of the milling aids and/or dispersants is selected so that they do not act as a binder but instead act as a parting compound. The polymers and/or copolymers may be neutralized with monovalent and/or polyvalent cations or they may have free acid groups. Suitable monovalent cations include, for example, sodium, lithium, potassium or ammonium. Suitable polyvalent cations include, for example, calcium, magnesium, strontium or aluminum. The combination of sodium and magnesium is especially preferred. Milling aids and/or dispersants such as sodium polyphosphates and/or polyaspartic acid as well as their alkali and/or alkaline earth salts, sodium citrate and amines, alkanolamines, such as triethanolamine and triisopropanolamine may also be used advantageously either alone or in combination with others. Dispersant based on organometallic compounds may also be employed. However, it is also possible to use any other dispersant.

According to one exemplary embodiment, the amount of the pigment in the coating layer is from 60 to 97 wt.-%, based on the total weight of the coating layer, the amount of coating binder in the coating layer is from 6 to 12 wt.-%, based on the total weight of the pigment particles, and a rheology modifier is present in an amount of less than 1 wt.-%, based on the total weight of the pigment particles.

The coating layer may have a thickness of at least 1 μm, e.g. at least 5 μm, 10 μm, 15 μm or 20 μm. Preferably the coating layer has a thickness in the range of 1 μm up to 150 μm.

According to one embodiment of the present invention, the coating layer has a coat weight from 1 to 50 g/m², preferably from 2 to 40 g/m², more preferably from 3 to 30 g/m², and most preferably from 5 to 20 g/m².

Manufacture of the Inventive Print Medium

A method for producing a print medium is provided, the method comprising the steps of:

a) providing a substrate having a first side and a reverse side, and
b) applying a coating composition comprising pigment particles and at least one coating binder on the first side of the substrate to form a permeable coating layer,
wherein said pigment particles, when in form of a compacted bed, have a monomodal pore diameter distribution, a volume defined polydispersity expressed as full width at half maximum height (FWHM) from 36 to 80 nm, and a volume defined median pore diameter from 30 to 80 nm.

Preferably, the print medium produced by the inventive method is a flexographic print medium.

The coating composition can be in liquid or dry form. According to one embodiment, the coating composition applied in step b) of the inventive method is a dry coating composition. According to another embodiment, the coating composition applied in step b) of the inventive method is a liquid coating composition. In this case, the inventive method further comprises a step c) of drying the coating layer.

According to one embodiment, method step b) is also carried out on the reverse side of the substrate to manufacture a print medium being coated on the first and the reverse side. This step may be carried out for each side separately or may be carried out on the first and the reverse side simultaneously. According to another embodiment, wherein the coating composition is in liquid form, method steps b) and c) are also carried out on the reverse side of the substrate to manufacture a print medium being coated on the first and the reverse side. These steps may be carried out for each side separately or may be carried out on the first and the reverse side simultaneously.

According to one embodiment, step b) is carried out a second time or more times using a different or the same coating composition. According to another embodiment, wherein the coating composition is in liquid form, steps b) and c) are carried out a second time or more times using a different or the same liquid coating composition.

The coating layer may be applied onto the substrate by conventional coating means commonly used in this art. Suitable coating methods are, e.g., air knife coating, electrostatic coating, metering size press, film coating, spray coating, wound wire rod coating, slot coating, slide hopper coating, gravure, curtain coating, high speed coating and the like. Some of these methods allow for simultaneous coatings of two or more layers, which is preferred from a manufacturing economic perspective. However, any other coating method which would be suitable to form a coating layer on the substrate may also be used.

In an exemplary embodiment the coating composition is applied by high speed coating, metering size press, curtain coating, spray coating, blade coating, or electrostatic coating. In a preferred embodiment, high speed coating is used to apply the coating layer. In another preferred method, curtain coating is used to apply the coating layer. According to an exemplary embodiment, a liquid coating composition is applied by high speed coating, metering size press, curtain coating, spray coating, or blade coating, preferably curtain coating. According to another exemplary embodiment, a dry coating composition is applied by electrostatic coating.

According to one embodiment of the present invention, the liquid coating composition used to form the coating layer has a solid content from 10 to 80 wt-%, preferably from 30 to 75 wt.-%, more preferably from 40 to 70 wt.-%, and most preferably from 45 to 65 wt.-%, based on the total weight of the liquid coating composition.

The liquid coating composition can have a Brookfield viscosity in the range from 20 to 3000 mPa·s, preferably from 250 to 3000 mPa·s, and more preferably from 1000 to 2500 mPa's.

According to one embodiment of the present invention, the coating composition, when in form of a compacted bed, has a monomodal pore diameter distribution. According to another embodiment of the present invention, the coating composition, when in form of a compacted bed, has a volume defined polydispersity expressed as full width at half maximum height (FWHM) from 36 to 80 nm, preferably from 40 to 80 nm, more preferably from 45 to 75 nm, and most preferably from 50 to 70 nm.

According to one embodiment of the present invention, the coating composition, when in form of a compacted bed, has a volume defined median pore diameter from 30 to 80 nm, preferably from 35 to 75 nm, and more preferably from 40 to 70 nm. According to another embodiment of the present invention, the coating composition, when in form of a compacted bed, has an intruded total specific void volume from 0.20 to 0.50 $cm^3/g$, preferably from 0.25 to 0.48 $cm^3/g$, more preferably from 0.30 to 0.45 $cm^3/g$, and most preferably from 0.35 to 0.40 $cm^3/g$.

After coating, the print medium may be subject to calendering or super-calendering to enhance surface smoothness. For example, calendering may be carried out at a temperature from 20 to 200° C., preferably from 60 to 100° C. using, for example, a calender having 2 to 12 nips. Said nips may be hard or soft, hard nips, for example, can be made of a ceramic material. According to one exemplary embodiment, the coated print medium is calendered at 300 kN/m to obtain a glossy coating. According to another exemplary embodiment, the coated print medium is calendered at 120 kN/m to obtain a matt coating.

Examples of print media according to the present invention comprising a substrate and at least one coating layer are shown in FIGS. 1 to 4.

According to one embodiment, the print medium according to the present invention is used in a flexographic printing application, preferably in wet-on-wet flexography, and more preferably in wet-on-wet pre-print or wet-on-wet post-print flexography, and most preferably in in-line wet-on-wet post-print flexography. However, the print medium of the present invention may also be used in other printing applications such as offset printing or inkjet printing.

The scope and interest of the invention will be better understood based on the following figures and examples which are intended to illustrate certain embodiments of the invention and are non-limitative.

EXAMPLES

1. Measurement Methods

Figure 1:
FIG. 1 shows a print medium according to the present invention comprising a one-layer substrate (2) and a coating layer (1) on the first side of the substrate.
Figure 2:
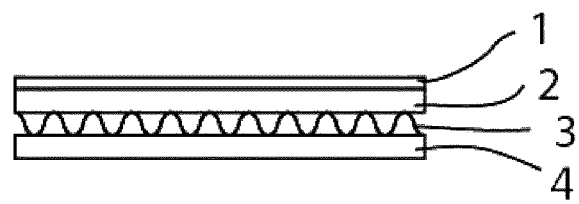
FIG. 2 shows a print medium according to the present invention comprising a substrate being structured by three sublayers (2, 3, 4) and a coating layer (1) on the first side of the substrate.
Figure 3:
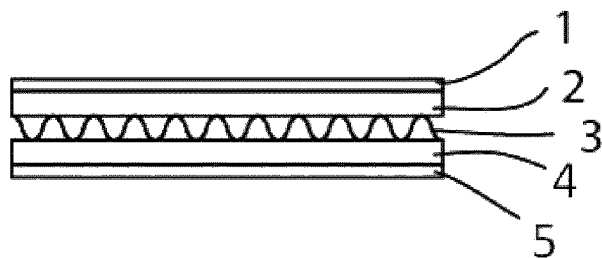
FIG. 3 shows a print medium according to the present invention comprising a substrate being structured by three sublayers (2, 3, 4) and a coating layer (1) on the first side of the substrate and a coating layer (5) on the reverse side of the substrate.
Figure 4:
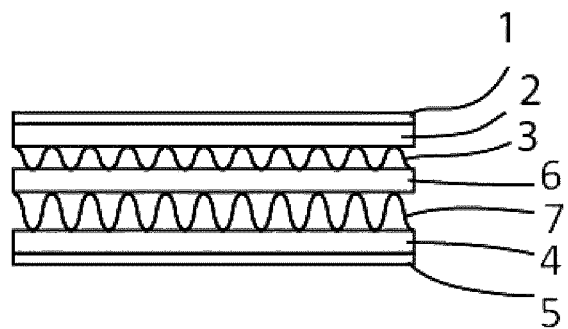
FIG. 4 shows a print medium according to the present invention comprising a substrate being structured by five sublayers (2, 3, 4, 6, 7) and a coating layer (1) on the first side of the substrate and a coating layer (5) on the reverse side of the substrate.

In the following, materials and measurement methods implemented in the examples are described.

Particle Size

The particle size distribution of the pigment particles was measured using a Sedigraph 5120 from the company Micromeritics, USA. The method and the instruments are known to the skilled person and are commonly used to determine grain size of fillers and pigments. The measurement was carried out in an aqueous solution comprising 0.1 wt.-% $Na_4P_2O_7$. The samples were dispersed using a high speed stirrer and supersonics.

Solids Content of an Aqueous Suspension

The suspension solids content (also known as "dry weight") was determined using a Moisture Analyser HR73 from the company Mettler-Toledo, Switzerland, with the following settings: temperature of 120° C., automatic switch off 3, standard drying, 5 to 20 g of suspension.

Brookfield Viscosity

The Brookfield viscosity of the liquid coating compositions was measured after one hour of production and after one minute of stirring at room temperature at 100 rpm by the use of a Brookfield viscometer type RVT equipped with an appropriate spindle.

Specific Surface (BET) Measurement. The specific surface area (in $m^2/g$) of the mineral filler was determined using nitrogen and the BET method, which is well known to the skilled man (ISO 9277:2010). The total surface area (in $m^2$) of the mineral filler was then obtained by multiplication of the specific surface area by the mass (in g) of the mineral filler. The method and the instrument are known to the skilled person and are commonly used to determine the specific surface of fillers and pigments.

Viscosity of the Printing Inks

The printing inks were adjusted to a viscosity of between 18" to 24" by measuring the time in seconds, which a defined volume of ink (DIN 4 mm cup) needs in order to run through the nozzle of said cup (EN ISO 2431:2012-03).

pH Measurement

The pH was measured at 25° C. using a Mettler Toledo Seven Easy pH meter and a Mettler Toledo InLab® Expert Pro pH electrode. A three point calibration (according to the segment method) of the instrument was first made using commercially available buffer solutions having pH values of 4, 7 and 10 at 20° C. (from Aldrich). The reported pH values were the endpoint values detected by the instrument (the endpoint was when the measured signal differs by less than 0.1 mV from the average over the last 6 seconds).

Pigment Brightness and Paper Opacity

Pigment brightness and paper opacity were measured using an ELREPHO 3000 from the company Datacolor according to ISO 2469:1994 (DIN 53145-2:2000 and DIN 53146:2000).

Paper Gloss

Paper and print gloss were measured using LGDL-05.3-lab instrumentation from the company Lehmann Messsysteme GmbH, DE-Koblenz according to EN ISO 8254-1:2003, TAPPI 75° (%).

Optical Print Density

Optical print density was measured using a SpectroDens spectrometer from Techkon GmbH, Germany, according to DIN 16527-3:1993-11.

Formation of a Compacted Bed

A compacted bed or tablet formulation of a pigment was formed in a wet tablet press apparatus by applying a constant pressure (usually 15 bar) to the pigment suspension or slurry for several hours such that water is released by filtration through a fine 0.025 m filter membrane resulting in a compacted bed or tablet of the pigment with a diameter of about 4 cm and a thickness of 1 to 1.5 cm. The obtained tablets can be divided and fashioned into suitable sample configurations for subsequent analysis. The apparatus used is shown schematically in Ridgway et al. "Modified calcium carbonate coatings with rapid absorption and extensive liquid uptake capacity" (Colloids and Surfaces A: Physiochem. and Eng. Asp. 2004, 236(1-3), 91-102). The tablets were removed from the apparatus and dried in an oven at 60° C. for 24 hours.

Porosity Measurements

Portions of a compacted bed or tablet formulation were characterized by mercury porosimetry for porosity, intruded total specific void volume, and pore size distribution using a Micromeritics Autopore IV mercury porosimeter. The maximum applied pressure of mercury was 414 MPa, equivalent to a Laplace throat diameter of 0.004 μm. The data were corrected using Pore-Comp (P. A. C. Gane et al. "Void Space Structure of Compressible Polymer Spheres and Consolidated Calcium Carbonate Paper-Coating Formulations" (Industrial and Engineering Chemistry Research 1996, 35 (5), 1753-1764) for mercury and penetrometer effects, and also for sample compression. By taking the first derivative of the cumulative intrusion curves the pore size distributions based on equivalent Laplace diameter, inevitably including pore-shielding, was revealed. Volume defined median pore diameter was calculated from the mercury intrusion curve, and FWHM is calculated from the pore size distribution curve.

Permeability Measurements

According to Ridgway et al. "A new method for measuring the liquid permeability of coated and uncoated papers and boards" (Nordic Pulp and Paper Research Journal 2003, 18(4), 377-381) for measuring the permeability, measurement samples were prepared by placing a cuboidal piece of a tablet (compacted bed) structure having an area of 15 mm×15 mm and a height of 10 mm into a PTFE-mould and pouring the resin Technovit 4000 (Heraeus GmbH, Wherheim/Ts, Germany) around it to produce a sample disk having a diameter of 30 mm. The quickly rising viscosity of the chosen curing resin results in a penetration of approximately 1 mm locally at the outer boundaries of the sample. This penetration depth is clearly visible because of the opacity change at the edge of the sample and can, therefore, be calibrated. The open area of the porous sample, i.e. that free from resin, is evaluated so that the permeable cross-sectional area can be established. The sample discs are placed in a dish containing the probe liquid in order to saturate the void network of the sample before placing in the apparatus. Hexadecane was used in the experiments with density, $\rho=773$ kgm$^{-3}$ and viscosity, $\eta=0.0034$ kgm$^{-1}$ s$^{-1}$ to avoid any interaction with synthetic or natural binders if present. The sample disc is then placed in a specially constructed pressure cell. The cell design used for the pressurised permeability experiments is described in Ridgway et al. (Nordic Pulp and Paper Research Journal 2003, 18(4), 377-381). Gas over-pressure is supplied from a nitrogen bottle. The pressure cell is fixed over a Mettler Toledo AX504 microbalance and a PC samples the balance data using specially-developed software developed within Omya AG. A drop captor device was needed in the base of the cell to guide the permeated liquid drops to the outlet. An important point of practical technique is that the whole chamber below the position of the sample has to be pre-wetted with the liquid so that each drop leaving the sample causes a drop to fall into the sampling dish. Once these precautions are taken the continuity of flow is ensured.

Absorption Rate Measurements

According to Schoelkopf et al. "Measurement and network modelling of liquid permeation into compacted mineral blocks" (Journal of Colloid and Interface Science 2000, 227 (1), 119-131) for the measurement of the "absorption rate", compacted bed samples were coated with a thin barrier line of silicone around the base of the vertical edges arising from the basal plane to reduce artefacts caused by the wetting of their outer surfaces. The remainder of the outer planes were not coated, to allow for the free movement of displaced air or liquid during absorption, and to minimise any interaction between the silicone and the absorbed liquid. Once the sample is lowered to contact the absorbing fluid source, the weight loss from the dish is continually recorded using an automated microbalance, namely a PC-linked Mettler Toledo AX504 balance with a precision of 0.1 mg, capable of 10 measurements per second, accounting for any evaporation if present. When the recorded weight is constant, indicative of absorption-saturation, the measurement is complete. Knowing the sample weight before and after the absorption measurement allows the intruded volume per gram of sample to be calculated. (Dividing the weight difference by the density of the liquid gives the volume intruded into the sample, and hence the volume per gram of sample).

Lab-Scale Print Evaluation (Flexographic Print)

Figure 5:
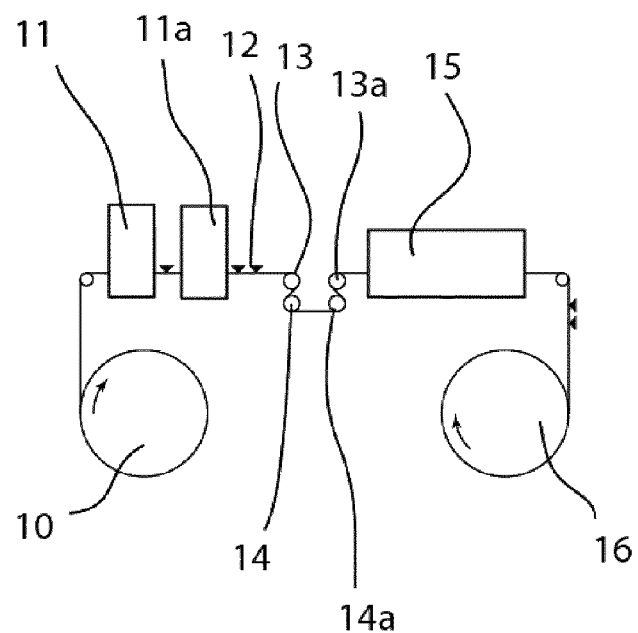
FIG. 5 illustrates schematically the set-up of a lab-scale printing device used to evaluate the printing quality of comparative and inventive test substrates.
Figure 7:
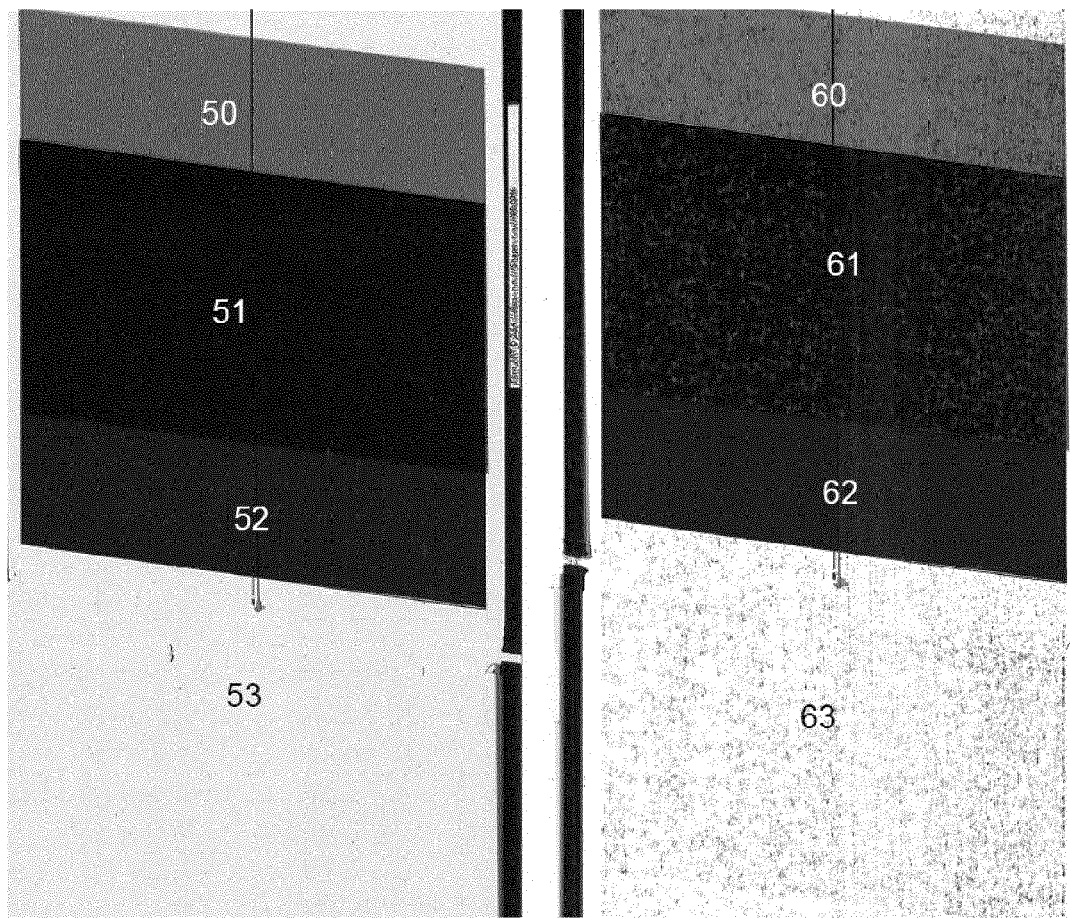
FIG. 7 shows two color flexographic test prints carried out on a single-coated print medium according to the invention (right-hand figure) and a comparative single-coated print medium (left-hand figure).

In order to evaluate the print quality of the test substrates the lab-scale printing device Testacolor TFM 157-2 (Norbert Schlifli Maschinen, Switzerland), was deployed. This device is a roll to roll press equipped with two flexo print units without intermediate drying as shown in FIG. 5. From the unwind (10) the substrate passes 2 print units (11, and 11a) each comprising an ink feed designed as a closed ink chamber loop, a metering device designed as an anilox roller (nominally transferring 15.2 cm$^3$/m$^2$ (per unit) of ink to the substrate), a plate carrier cylinder and an impression cylinder. After having passed the second print unit (11a), two layers of ink are on top of the test substrate's surface (12). Industrially standard water based inks, such as SunChemical AquaTop or NovoPrint series, in particular cyan and magenta, were employed. The viscosity of the inks was adjusted using the DIN 4 mm viscosity cup by adding tab water to values between 18 seconds and 24 seconds as commonly used in the field of the printing industry. The pH of the ink was between 8 and 9. In order to simulate the effect of mechanical stress on the substrate's surface, the test substrate was guided around four rolls (13, 13a, 14, and 14a) in a distance of 700 mm, where the substrate's surface was in full contact with the rollers (14 and 14a) at a constant substrate tension (value 3 at the Schlafli control unit, on a scale up to 10). The printing speed was 100 m/min. Depending on the ink's drying behavior on top of a particular test substrate smearing could be observed as shown in FIG. 7. After the printing process, the test substrate can optionally be passed through a hot-air-dryer (15) to further dry the ink, and is then fed to a rewind (16).

TABLE 1

| Lab-scale printing conditions. | |
|---|---|
| Machine type | Testacolor TRM 157 2, Norbert Schläfli Maschinen, Switzerland |
| Process | 2 color, wet-on-wet, roll-to-roll process |
| Ink supplier | Michael Huber München GmbH, Germany |
| Ink viscosities (DIN 4 cup) | Cyan and magenta: 21" |
| Ink pH | Cyan: 8.66; magenta: 8.45 |
| Ink sequence | 1$^{st}$ unit: cyan<br>2$^{nd}$ unit: magenta |
| Speed | 100 m/min |
| Anilox | Screening; 2 × 120 l/cm (URMI dip volume; 15.4 cm$^3$/m$^2$) |
| Test substrate dimension | 150 mm × 300 mm |
| Plates | DuPont ™ Cyrel ® DPR (thickness: 1.14 mm; plate hardness: 76 Shore A)<br>Flint Group nyloflex ® ART Digital (thickness: 2.54 mm; plate hardness: 50 Shore A) |

Industrial-Scale Print Evaluation (Flexographic Print)

Figure 6:
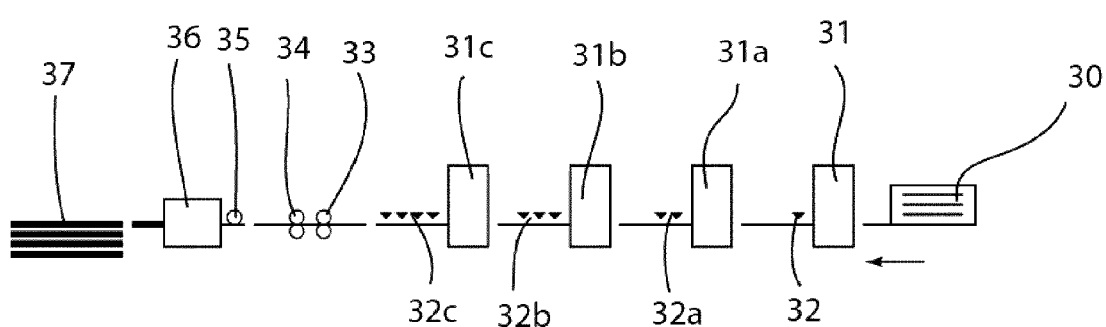
FIG. 6 illustrates schematically the set-up of an industrial-scale printing device comprising post press processing units to evaluate the printing quality of comparative and inventive test substrates.

In order to evaluate both the printability and print quality at industrial scale, print trials have been carried out on a Martin 618 Flexo folder gluer (Bobst Group S.A., Switzerland). This device is a corrugated sheet press equipped with four flexo print units (31, 31a, 31b, and 31c), without an intermediate drying equipment, and with an attached die cutting, creasing, gluing and folding equipment as shown in FIG. 6. The sheets/test substrates are transported via a conveyor belt from a pile stacker (30) to the subsequent process steps. Each print unit (31, 31a, 31b, 31c) comprises an ink feed designed as a closed ink chamber loop, a metering device designed as an anilox roller (nominally transferring an ink amount of 10 cm$^3$/m$^2$ between print unit 31 and 31a, and an ink amount of 8.5 cm$^3$/m$^2$ between print unit 31b and 31c), a plate carrier cylinder and an impression cylinder. After having passed the particular print units (31, 31a, 31b, and 31c), one- (32), two- (32a), three- (32b) or four-layers (32c) of ink have been transferred to the sheet, respectively. Industrially standard water-based inks, such as SunChemical AquaTop or NovoPrint series, in particular cyan, magenta, yellow and black were employed. The viscosity of the inks was adjusted using the DIN 4 mm viscosity cup by adding tab water to values between 15 seconds and 30 seconds. The pH of the inks used was between 8 and 9. The printing speed varied between 5 000 to 12 000 sheets/min. The test substrate dimension was 1 400 mm×500 mm, which corresponds to printing speeds of between 40 m/min to 100 m/min. After having passed the last print unit (31c), the test substrate is immediately fed into the subsequent processing steps of die cutting (33), creasing (34), gluing (35) and folding (36), where the test substrate's surface comes into direct contact with the guide rolls or tools. In case of insufficient fastening/drying of the inks, deposition and/or smearing of the inks on the test substrate can occur. Finally, the ready product is fed to the delivery (37).

TABLE 2

Industrial-scale printing conditions.

| | |
|---|---|
| Machine type | Martin 618, Bobst Group S.A., Switzerland |
| Process | 4 color, wet-on-wet sheet feed, corrugated post print process |
| Ink supplier | Batch 1: Sun Chemical "Aquatop" (standard ink) |
| | Batch 2: Sun Chemical "Novoprint" (fast drying) |
| Ink viscosities (DIN 4 cup) | Batch 1: black: 28"; cyan: 26"; magenta: 29"; yellow: 30" |
| | Batch 2: black: 17"; cyan: 17"; magenta: 21"; yellow: 25" |
| Ink pH | all inks: 8.5 |
| Ink sequence | $1^{st}$ unit: black; $2^{nd}$ unit: cyan; $3^{rd}$ unit: magenta; $4^{th}$ unit: yellow |
| Speed | $1^{st}$ run; 8 500 sheets/h (85 m/min) |
| | $2^{nd}$ run: 15 000 sheets/h (125 m/min) |
| Anilox | Screening: n.n. (Unit 1 & 3 dip volume: 10 $cm^3/m^2$) |
| | Screening: n.n. (Unit 2 & 4 dip volume: 8.5 $cm^3/m^2$) |
| Test substrate dimension | 1 400 min × 500 mm |
| Plates | Flint Group nyloflex ® FSC Digital (thickness: 4.7 mm; plate hardness: 76 Shore A) |

Evaluation of the Smearing on Test Substrates Manufactured on the Lab Scale Printing Device The following method was used to determine and quantify the smearing in flexographic printing of coated liners. The method can be divided into four steps, which are carried out successively.

1. Digitization of a Printed Area

A digital camera, computer controlled and mounted on a stage, was used to digitize a statistically reasonable sample area for the quantification of smearing. A resolution of 3 456×2 304 pixels was chosen to cover an area of 6.81×4.27 $cm^2$. The obtained images were saved as jpeg files without data compression.

2. Image Preparation

A digital image usually consists of three channels or matrices, representing red, green and blue color, and 256 shades per color. The color channels were separated into individual images consisting of only one matrix but also 256 shades using the free software IrfanView. An additional grey scale image was calculated from the original images with IrfanView. The newly generated images were further analyzed with the free software GNU Octave.

3. Image Analysis

The free software GNU Octave was used to analyze the newly generated images. Said software handles images as matrices and allows simple manipulations of these images. An algorithm to calculate the cumulative frequency for all possible grey levels (0 to 255) was developed, and is shown in the following:

```
function [counts,freque] = smearing % call function
ticks=0:1:255; % definition of classes or edges (grey scales)
freque(:,1)=ticks; % definition of results file
dirlist=dir(pwd); % look for files in working directory
for i=3:length(dirlist)-1 % handle all files in directory
    img=imread(dirlist(i).name); % read the (i-2)^th image from dir.
    helpvec=reshape(img,[ ],1); % transform matrix to vector
```

-continued

```
    help256=histc(helpvec,ticks); % count number of values
    help256=cumsum(help256); % cumulate the counts
    help256=help256/help256(length(help256)); % calculate frequencies
    freque(:,i-1)=help256; % compile results file
end
save RESULTSfreque.txt "freque" "-ascii" % save results file
endfunction
```

This algorithm is started from a user interface (GUI Octave) and returns a text file (RESULTSfreque.txt in the working directory) with complied results for further analysis.

4. Meaningful Preparation of Results

Figure 8:
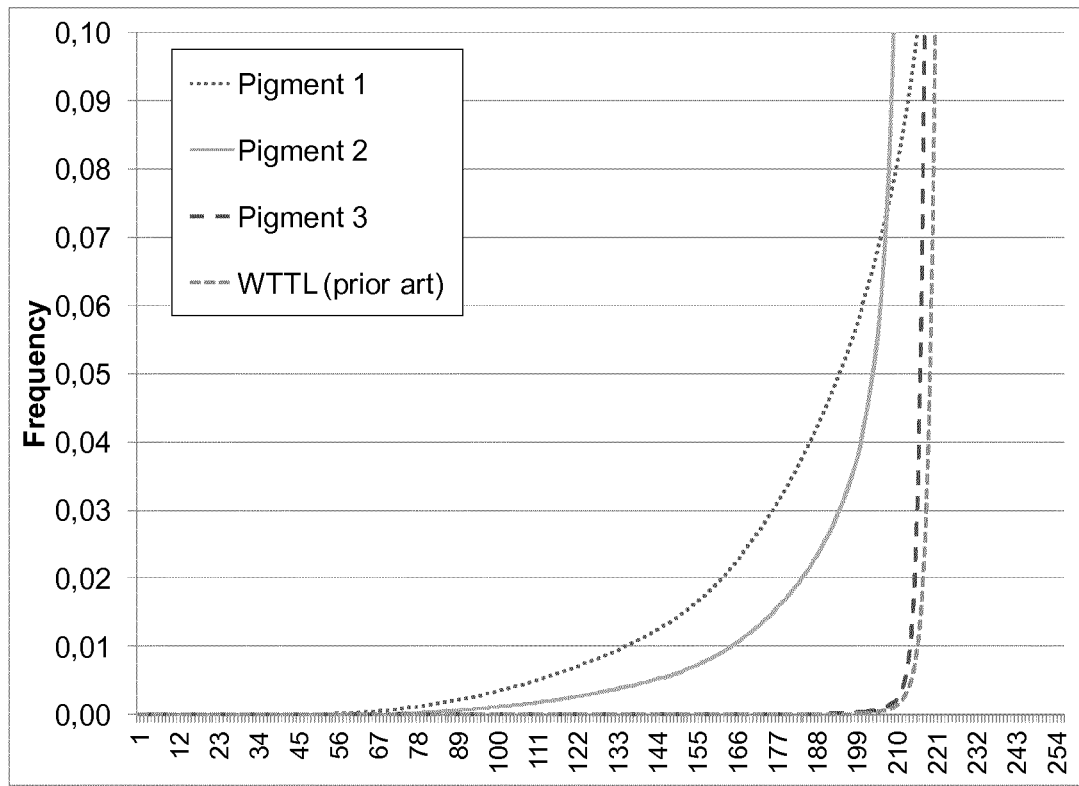
FIG. 8 shows a graph illustrating the cumulative distribution of grey scales evaluated based on images of comparative and inventive test substrates.
Figure 9:
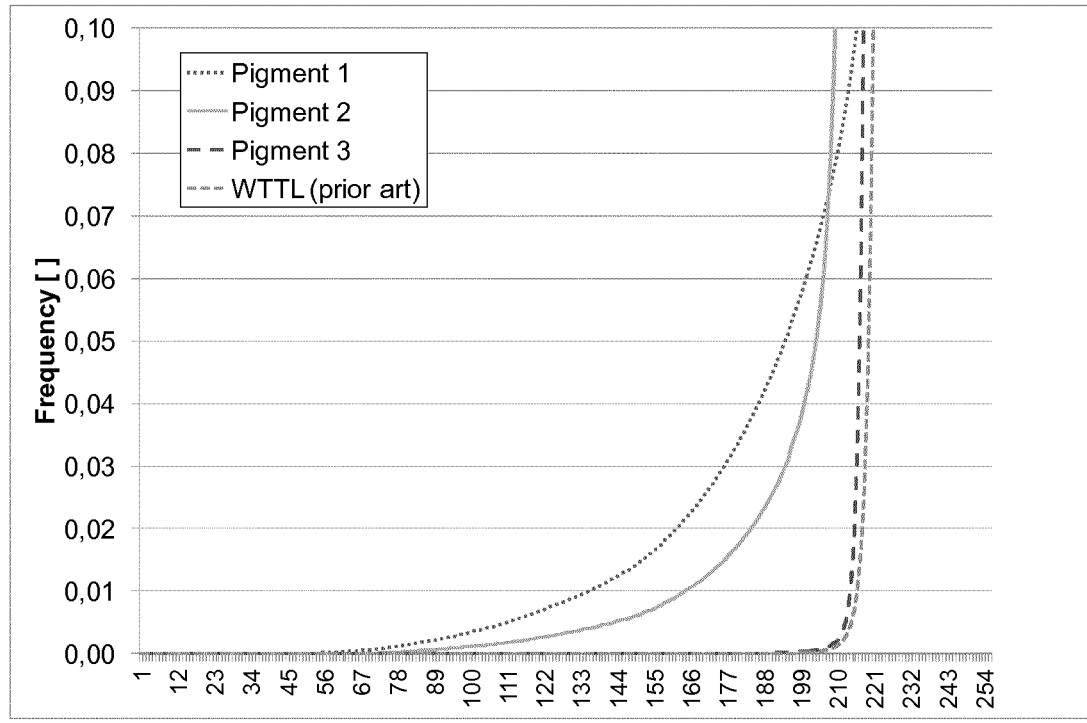
FIG. 9 shows a section of FIG. 8 in the range of 50 to 150 grey scale levels (out of 256).

Excel was used to create a graph as shown in FIG. 8. FIG. 8 shows the cumulative distributions for the different color channels or shades 0 to 255 of the grey scale image. The average frequency (dimensionless) corresponds to the fraction of the test substrate area, which is covered by a specific shade. The best detection of smearing is in the threshold range of 50 to 150, which is shown in FIG. 9, and is indicated by almost constant ranks and the largest differences in the cumulative distributions. In that way an average frequency can be calculated for this shade interval.

2. Examples

A. Flexographic Printing

The following components were used to prepare the liquid coating compositions applied to the substrate, as compiled in Table 4 below.

Substrate: Top ply sized testliner III with a basis weight (grammage) of 125 $g/m^2$, commercially available from Hamburger Pitten GmbH & Co. KG, Austria.

Pigment 1: Omyaprime HO 40 GO (precipitated calcium carbonate), commercially available from Omya AG, Switzerland.

Pigment 2: Omya Hydrocarb 60 GU (ground calcium carbonate), commercially available from Omya AG, Switzerland.

Pigment 3: Precipitated calcium carbonate ($d_{50}$: 230 nm, BET: 19.1 $m^2/g$).

Pigment 4: Omya Covercarb 75 GU 71.5% (ground calcium carbonate), commercially available from Omya AG, Switzerland.

Pigment 5: Naturally ground calcium carbonate ($d_{50}$: 250 nm, BET: 24.8 $m^2/g$).

Binder: Litex PX 9464 (anionic carboxylated styrene/butadiene copolymer), commercially available from Synthomer Deutschland GmbH, Germany.

Rheology modifiers: Sterocoll DF3x (acrylate copolymer) and Lumiten I-SC (Solution of sodium sulphosuccinate), both commercially available from BASF, Germany.

Table 3 shows the properties of the pigments used to produce the coating compositions characterized in Table 4.

TABLE 3

Pigment properties.

| Pigment | intruded total specific void volume [$cm^3/g$] | Median pore diameter [μm] | FWHM [μm] | specific surface area (BET) [$m^2/g$] | $d_{50}$ [μm] | Modality |
|---|---|---|---|---|---|---|
| Pigment 1 (comparative) | 0.214 | 0.09 | 0.064 | 12.35 | 0.360 | Multimodal |
| Pigment 2 (comparative) | 0.116 | 0.09 | 0.068 | 7.28 | 1.467 | Multimodal |

TABLE 3-continued

Pigment properties.

| Pigment | intruded total specific void volume [cm³/g] | Median pore diameter [μm] | FWHM [μm] | specific surface area (BET) [m²/g] | $d_{50}$ [μm] | Modality |
|---|---|---|---|---|---|---|
| Pigment 3 (inventive) | 0.384 | 0.07 | 0.057 | 19.1 | 0.230 | Monomodal |
| Pigment 4 (comparative) | 0.186 | 0.07 | 0.058 | 11.15 | 0.607 | Multimodal |
| Pigment 5 (inventive) | 0.303 | 0.06 | 0.042 | 24.8 | 0.250 | Monomodal |

Preparation of Pigment 5

Norwegian marble rocks of the region of Molde, Norway, having a diameter of 10-300 mm were autogenously dry ground (i.e. in the absence of grinding media) to a fineness of a $d_{50}$ of 42-48 μm. This material was wet ground at a solids content of 25 wt.-% in tap water in a vertical attritor mill of a volume of 1500 liter in a continuous mode, using zircon silicate beads of 0.3-0.7 mm without any additives such as dispersing and/or grinding aids to a fineness until the $d_{98}$ was 2.05 μm and the $d_{50}$ was 0.55 μm.

The product was further ground at a solids content of 20 wt.-% in a vertical attritor mill of a volume of 1500 liter in continuous mode, using zircon silicate beads of 0.3-0.7 mm by the addition of 0.40 wt.-% of a sodium/calcium polyacrylate dispersant having a molecular weight (Mw) of 5500 and polydispersity of 2.7. The obtained product has a $d_{98}$ of 0.69 μm and a $d_{50}$ of 0.25 μm. The temperature in both grinding steps was approximately 85° C.

This slurry was then concentrated to a solids content of 50% wt.-% in a thermal evaporator and before evaporation another 0.45 wt.-% of the sodium/calcium polyacrylate dispersant having a molecular weight (Mw) of 5500 and polydispersity of 2.7 dispersing agent was added.

A fraction of this slurry having a solids content of 50 wt.-% was further concentrated to a solids content of 56 wt.-%. The pH of the two samples is 10.2 and the Brookfield viscosity is 65 mPa·s and 56 mPa·s, respectively.

The foregoing pigments were used to prepare three different liquid coating compositions (see Table 4) to demonstrate the invention.

TABLE 4

Coating compositions.

| | Coating composition A (prior art) [wt.-%, based on total amount of dry material] | Coating composition B (inventive) [wt.-%, based on total amount of dry material] | Coating composition C (prior art) [wt.-%, based on total amount of dry material] | Coating composition D (inventive) [wt.-%, based on total amount of dry material] |
|---|---|---|---|---|
| Pigment 1 | 60.44 | — | — | — |
| Pigment 2 | 30.22 | — | — | — |
| Pigment 3 | — | 90.66 | — | — |
| Pigment 4 | — | — | 92.33 | — |
| Pigment 5 | — | — | — | 90.66 |
| Binder | 9.07 | 9.07 | 7.39 | 9.07 |
| Rheology modifiers | 0.27 | 0.27 | 0.25 | 0.27 |

The liquid coating compositions A (prior art example), which is a typical top coating formulation for white top liner, or B or D (inventive compositions) was single-coated with a curtain coating machine, PTS Munich, with an amount of 17 to 20 g/m² on the substrate. The solids content of the liquid coating compositions was about 60 wt.-%, based on the total weight of the liquid composition. The coating layer was dried on the coating machine to end moisture content of 4.5 to 5%

To prepare a double-coated substrate, the substrate was multi-layer curtain coated with a curtain coating machine at the PTS Munich. The pre-coat was applied with an amount of about 13 g/m² of the liquid pre-coating composition C. The solids content of the liquid coating compositions was about 68 wt.-%, based on the total weight of the liquid composition. The top coating layer additional applied in the same sequence like the pre-coat with the same curtain coating machine at PTS Munich, with an amount of 5 to 7 g/m² of liquid coating composition B (inventive composition) (see Table 4 above), which is a typical top coating formulation for white top liner. The solids content of the liquid coating compositions was about 60 wt.-%, based on the total weight of the liquid composition. Both coating layer were dried on the coating machine to an end moisture content of 4.5 to 5%.

The print quality of the test substrates in flexographic printing was evaluated by measuring the optical densities. The results using the flexographic printing system Martin 618 (Bobst Group S.A., Schweiz) with a color volume of 37 cm³/m² are shown in Table 5. Furthermore, a comparison of the gloss and print gloss values measured for the test substrates is shown in Table 6. FIGS. 8 and 9 show graphs illustrating the smearing on an uncoated white top test liner (WTTL), on two comparative coated test substrates, and on a test substrate comprising the inventive coating layer.

TABLE 5

Optical density measured for test substrates printed on the flexographic printing system Martin 618 (Bobst Group S.A., Switzerland) with a color volume of 37 cm³/m².

| | OD sum (cyan, magenta) | OD sum (cyan, magenta, yellow, black) |
|---|---|---|
| Uncoated substrate | 2.74 | 5.99 |
| Substrate + composition A (comparative) | 3.84 | 8.42 |
| Substrate + composition B (inventive) | 4.10 | 8.31 |
| Substrate + composition C + composition B (inventive) | 4.27 | 8.45 |

TABLE 5a

Optical density measured for test substrates printed on the flexographic lab scale printing system Testacolor TRM 157 2, Norbert Schläfli Maschinen, Switzerland described in Table 1.

| | OD cyan | OD magenta |
|---|---|---|
| Substrate + composition A (comparative) | 1.42 | 1.42 |
| Substrate + composition D (inventive) | 1.79 | 1.27 |

TABLE 6

Gloss and print gloss measured for the test non calendered substrates printed on the flexographic printing system Martin 618 (Bobst Group S.A., Switzerland) with a color volume of 37 cm³/m².

|  | Paper Gloss | Print gloss black | Print gloss cyan | Print gloss magenta |
| --- | --- | --- | --- | --- |
| Uncoated substrate | 5.00 | 3.60 | 3.33 | 2.97 |
| Substrate + composition A (comparative) | 20.00 | 32.00 | 25.00 | 28.00 |
| Substrate + composition B (inventive) | 26.00 | 31.00 | 24.00 | 28.00 |
| Substrate + composition C + composition B (inventive) | 30.00 | 34.00 | 24.00 | 28.00 |
| Substrate + composition D (inventive) | 26.00 | 37.00 | 34.00 | 36.00 |

The results show that the substrates comprising the inventive coating composition provide improved optical density and gloss values compared to the uncoated substrate. The optical density values obtained in flexographic printing using the single-coated substrate reveal that the optical density on the single-coated substrate comprising the inventive coating is comparable or even better than that of the single-coated substrate comprising the comparative coating. The same is true for the gloss and the print gloss values. Both the optical density and the gloss of the obtained printing can be improved by pre-coating the substrate before applying the inventive coating composition. Furthermore, it can be gathered from FIG. 7, right-hand figure that color flexographic printing using two colors (cyan and magenta) on the single-coated substrate comprising the comparative coating leads to an unacceptable smearing of the printed ink due to a slow absorption of the ink solvent (visible as grey spots in the lower part of the right-hand test print (63)). In contrast, smearing of the printed ink is not observed in color flexographic printing on the single-coated substrate comprising the inventive coating (see FIG. 7, lower part of left-hand test print (53)). The areas of the test substrates, which are designated with reference signs (50) and (60), respectively, are printed in cyan, the areas which are designated with reference signs (52) and (62), respectively, are printed in magenta, and the areas (51) and (61) are a mixture of cyan and magenta resulting in a dark violet.

Figure 10:
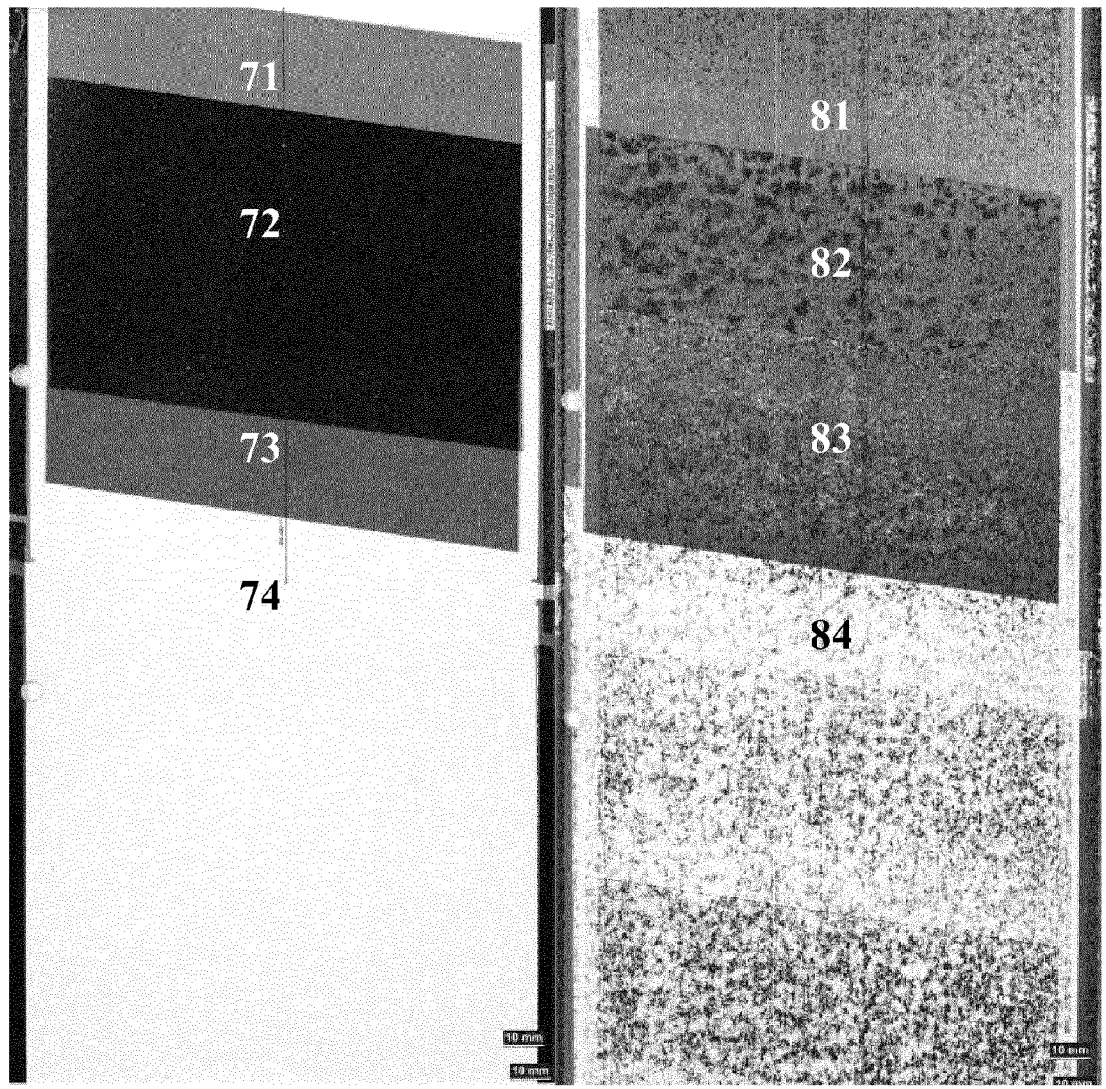
FIG. 10 shows two color flexographic test prints carried out on a single-coated print medium according to the invention (right-hand figure) and a comparative single-coated print medium (left-hand figure).

The same applies to the inventive coating versa the comparative coating shown in FIG. 10, where pigment that is used in the inventive coating is a natural ground calcium carbonate. It can be gathered from FIG. 10, right-hand figure that color flexographic printing using two colors (cyan and magenta) on the single-coated substrate comprising the comparative coating leads to an unacceptable smearing of the printed ink due to a slow absorption of the ink solvent (visible as grey spots in the lower part of the right-hand test print (83)). In contrast, smearing of the printed ink is not observed in color flexographic printing on the single-coated substrate comprising the inventive coating (see FIG. 10, lower part of left-hand test print (73)). The areas of the test substrates, which are designated with reference signs (70) and (80), respectively, are printed in cyan, the areas which are designated with reference signs (72) and (82), respectively, are printed in magenta, and the areas (71) and (81) are a mixture of cyan and magenta resulting in a dark violet.

The results of the evaluation of the smearing on the test substrates using the method and algorithm described above are shown in FIG. 8 and FIG. 9, which shows a section of the graphs of FIG. 8 in the shaded region from 50 to 150. It can be gathered from the graphs shown in FIGS. 8 and 9 that the smearing on the test substrate according to the present invention is much lower than on the test substrates comprising a coating layer according to the prior art and is comparable to the smearing on a uncoated white top test liner (WTTL).

B. Inkjet Printing

The following components were used to prepare the liquid coating compositions applied to the substrate, as compiled in Table 8 below.

Substrate: Uncoated Woodfree Basepaper with a basis weight (grammage) of 90 g/m², from Stora Enso Uetersen, Germany.

Pigment 6: Omyajet 5010 (modified calcium carbonate), commercially available from Omya AG, Switzerland.

Pigment 3: Precipitated calcium carbonate ($d_{50}$: 230 nm, BET: 19.1 m²/g).

Pigment 7: Omyajet 6000 G (modified calcium carbonate), commercially available from Omya AG, Switzerland.

Binder 2: CHP 104 (polyvinyl acetate), commercially available from CH Polymers OY, Finland.

Binder 3: BF 04 (polyvinyl alcohol), commercially available from Chang Chung Petrochemicals, China.

Table 7 shows the properties of the pigments used to produce the coating compositions characterized in Table 8.

TABLE 7

Pigment properties.

| Pigment | intruded total specific void volume [cm³/g] | Median pore diameter [μm] | FWHM [μm] | specific surface area (BET) [m²/g] | $d_{50}$ [μm] | Modality |
| --- | --- | --- | --- | --- | --- | --- |
| Pigment 6 (comparative) | 0.359 | 0.18/ 0.04 | 0.151 | 29.5 | 1.934 | Bi-modal |
| Pigment 3 (inventive) | 0.384 | 0.07 | 0.057 | 19.1 | 0.230 | Mono-modal |
| Pigment 7 (comparative) | 0.289 | 0.18/ 0.04 | 0.073 | 27.7 | 0.947 | Bi-modal |

The foregoing pigments were used to prepare three different liquid coating compositions (see Table 8) to demonstrate the invention.

TABLE 8

Coating compositions.

|  | Coating composition E (prior art) [wt.-%, based on total amount of dry material] | Coating composition F (invention) [wt.-%, based on total amount of dry material] | Coating composition G (prior art) [wt.-%, based on total amount of dry material] |
| --- | --- | --- | --- |
| Pigment 6 | 88.50 | — | — |
| Pigment 3 | — | 88.50 | — |
| Pigment 7 | — | — | 88.50 |
| Binder 2 | 8.85 | 8.85 | 8.85 |
| Binder 3 | 2.65 | 2.65 | 2.65 |

The liquid coating compositions E (prior art example), which is a typical top coating formulation for inkjet paper, or F (inventive composition) was single- and double coated with a blade coating machine, BASF Ludwigshafen, with an amount of 10 to 14 g/m² on the substrate. The solids content of the liquid coating compositions was about 57 wt.-%, based on the total weight of the liquid composition. The coating layer was dried on the coating machine to an end moisture content of 4.5 to 5%

To prepare a single-coated substrate, the substrate was single layer coated with a blade coating machine at BASF Ludwigshafen. The top coating layer was applied in this sequence with the a blade coating machine at BASF Ludwigshafen, with an amount of 10 to 14 g/m² of liquid coating composition F (inventive composition) (see Table 8 above), which is a typical top coating formulation for inkjet paper. The solids content of the liquid coating compositions was about 57 wt.-%, based on the total weight of the liquid composition. Both coating layer were dried on the coating machine to an end moisture content of 4.5 to 5%.

The print quality of the test substrates in inkjet printing was evaluated by measuring the optical color gamut volume and mottling. The results using the inkjet printing system HP OfficeJet Pro 8000 (Hewlett Packard, USA) are shown in Table 9. Furthermore, a comparison of the gloss and print gloss values measured for the test substrates is shown in Table 10. The mottling was measured using a printability tester of the type VIA-Prfifbau, Verity IA Print Targent, and the color gamut was measured using a SpectroDens spectrometer from Techkon GmbH, Germany.

TABLE 9

Optical density measured for test substrates printed on the HP OfficeJet Pro 8000 (HP, USA).

|  | Mottling sum (black, blue, green) | Color gamut |
| --- | --- | --- |
| Substrate + composition E (comparative) | 223.41 | 78'762 |
| Substrate + composition F (inventive) | 66.07 | 83'037 |
| Substrate + composition G (comparative) | 799.4 | 66'132 |

TABLE 10

Gloss and print gloss measured for the test uncalendered substrates printed on the HP OfficeJet Pro 8000 (HP, USA).

|  | Paper Gloss | Print gloss black | Print gloss cyan | Print gloss magenta |
| --- | --- | --- | --- | --- |
| Substrate + composition E (comparative) | 5 | 23 | 13 | 14 |
| Substrate + composition F (inventive) | 20 | 33 | 25 | 28 |
| Substrate + composition G (comparative) | 8 | 12 | 7 | 8 |

In inkjet printing mottling can be observed. Mottling is an uneven print appearance, mostly in solid areas: small dark and light areas in the surface of paper caused by ink. Mottling is influenced by many parameters: e.g. ink, color sequence, construction of printing press, and the like. Variations in the surface characteristics such as absorption and smoothness play an important role regarding mottle and are caused by the production process and the components within the paper.

Figure 12:
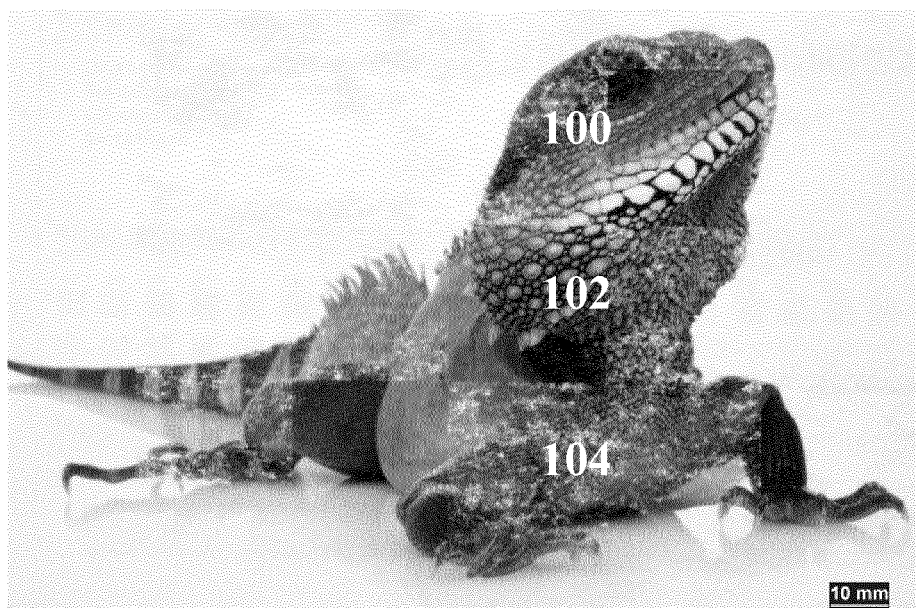
FIG. 12 shows an ink jet test print carried out on a comparative single-coated print medium.

With today's standard inkjet formulations unwanted deposit effects (so-called mottling) can be observed. For example, FIG. 12 shows an ink jet test print carried out on a comparative single-coated print medium. The areas of this test substrate, which are designated with reference signs (100) and (104), show unwanted deposit effects. In these areas undried ink of the previous sheet has been deposited on the present sheet via the blanket of the printing press. The areas designated with the reference sign (102) shows a good drying behavior and image quality.

Figure 11:
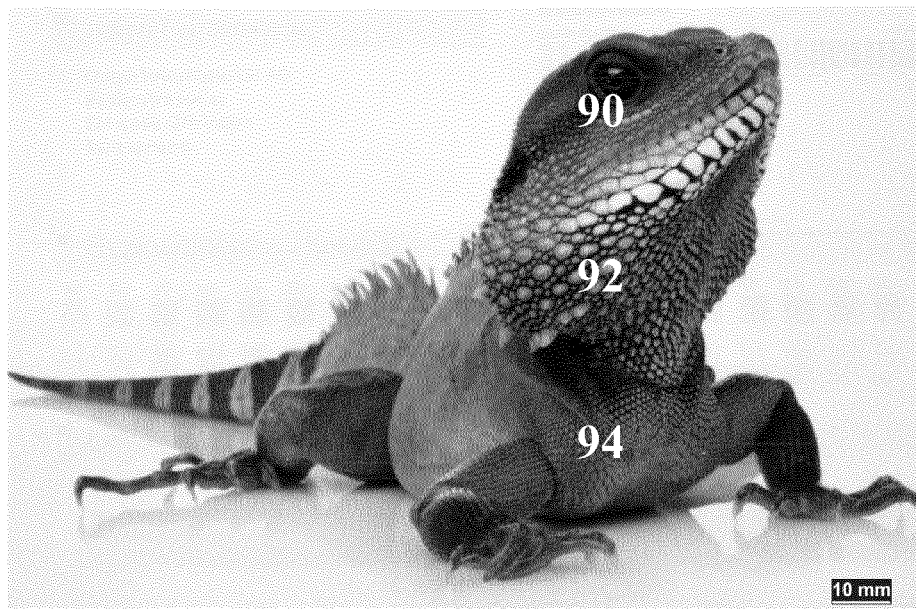
FIG. 11 shows an ink jet test print carried out on single-coated print medium according to the invention.

By contrast the inventive solution shown in FIG. 11 does not show any deposits and a perfect image reproduction in all areas. In FIG. 11 all areas of the test substrate, which are designated with reference signs (90), (92), and (94) show a perfect image reproduction.

The invention claimed is:

1. A print medium comprising a substrate having a first and a reverse side, wherein the substrate comprises at least on the first side at least one permeable coating layer comprising pigment particles,
   wherein said pigment particles, when in form of a compacted bed,
   have a monomodal pore diameter distribution,
   a volume defined polydispersity expressed as full width at half maximum height (FWHM) from 40 to 80 nm, and
   a volume defined median pore diameter from 30 to 80 nm.

2. The print medium of claim 1, wherein the substrate is selected from paper, cardboard, containerboard, plastic, cellophane, textile, wood, metal, or concrete.

3. The print medium of claim 1, wherein the substrate is selected from paper, cardboard, or containerboard.

4. The print medium of claim 1, wherein the substrate comprises at least one permeable coating layer on the first and the reverse side.

5. The print medium of claim 1, wherein the substrate is structured by at least two sublayers.

6. The print medium of claim 1, wherein the substrate is structured by three, five, or seven sublayers.

7. The print medium of claim 1, wherein the substrate is precoated with precipitated calcium carbonate, modified calcium carbonate, or ground calcium carbonate, or any mixture thereof.

8. The print medium of claim 1, wherein the pigment particles are selected from calcium carbonate, plastic pigments, polystyrene-based plastic pigments, titanium dioxide, dolomite, calcined clay, non-calcined (hydrous) clay, bentonite, or any mixture thereof.

9. The print medium of claim 1, wherein the pigment particles are calcium carbonate.

10. The print medium of claim 1, wherein the pigment particles are precipitated calcium carbonate.

11. The print medium of claim 1, wherein the pigment particles, when in form of a compacted bed, have a volume defined polydispersity expressed as full width at half maximum height (FWHM) from 45 to 75 nm.

12. The print medium of claim 1, wherein the pigment particles, when in form of a compacted bed, have a volume defined polydispersity expressed as full width at half maximum height (FWHM) from 50 to 70 nm.

13. The print medium of claim 1, wherein the pigment particles, when in form of a compacted bed, have a volume defined median pore diameter from 35 to 75 nm.

14. The print medium of claim 1, wherein the pigment particles, when in form of a compacted bed, have a volume defined median pore diameter from 40 to 70 nm.

15. The print medium of claim 1, wherein the pigment particles, when in form of a compacted bed, have an intruded total specific void volume from 0.20 to 0.50 cm³/g.

16. The print medium of claim 1, wherein the pigment particles, when in form of a compacted bed, have an intruded total specific void volume from 0.25 to 0.48 cm³/g.

17. The print medium of claim 1, wherein the pigment particles, when in form of a compacted bed, have an intruded total specific void volume from 0.30 to 0.55 cm$^3$/g.

18. The print medium of claim 1, wherein the pigment particles, when in form of a compacted bed, have an intruded total specific void volume from 0.35 to 0.40 cm$^3$/g.

19. The print medium of claim 1, wherein the pigment particles have a specific surface area from 10 to 30 m$^2$/g.

20. The print medium of claim 1, wherein the pigment particles have a specific surface area from 15 to 25 m$^2$/g.

21. The print medium of claim 1, wherein the pigment particles have a weight median particle size $d_{50}$ of ≤300 nm.

22. The print medium of claim 1, wherein the pigment particles have a weight median particle size $d_{50}$ of from 20 to 250 nm.

23. The print medium of claim 1, wherein the pigment particles have a weight median particle size $d_{50}$ of from 50 to 240 nm.

24. The print medium of claim 1, wherein the pigment particles have a weight median particle size $d_{50}$ of from 70 to 230 nm.

25. The print medium of claim 1, wherein the coating layer further contains a coating binder in an amount from 1 to 20 wt.-%, based on the total weight of the pigment particles.

26. The print medium of claim 1, wherein the coating layer further contains a coating binder in an amount from 3 to 15 wt.-%, based on the total weight of the pigment particles.

27. The print medium of claim 1, wherein the coating layer further contains a coating binder in an amount from 6 to 12 wt.-%, based on the total weight of the pigment particles.

28. The print medium of claim 1, wherein the coating binder is selected from starch, polyvinylalcohol, styrene-butadiene latex, styrene-acrylate latex, or polyvinyl acetate latex, or any mixture thereof.

29. The print medium of claim 1, wherein the coating binder is styrene-butadiene latex.

30. The print medium of claim 1, wherein the coating layer has a coat weight from 1 to 50 g/m$^2$.

31. The print medium of claim 1, wherein the coating layer has a coat weight from 2 to 40 g/m$^2$.

32. The print medium of claim 1, wherein the coating layer has a coat weight from 3 to 30 g/m$^2$.

33. The print medium of claim 1, wherein the coating layer has a coat weight from 5 to 20 g/m$^2$.

34. The print medium of claim 1, wherein the coating layer further comprises a rheology modifier in an amount of less than 1 wt.-%, based on the total weight of the pigment particles.

35. The print medium of claim 1, wherein the coating layer has a permeability of greater than $0.2 \times 10^{-17}$ m$^2$.

36. The print medium of claim 1, wherein the coating layer has a permeability of from $0.3 \; 10^{-17}$ m$^2$ to $3.0 \times 10^{-17}$ m$^2$.

37. The print medium of claim 1, wherein the coating layer has a permeability of from $0.4 \; 10^{-17}$ m$^2$ to $2.5 \times 10^{-17}$ m$^2$.

38. The print medium of claim 2, wherein the print medium is a flexographic print medium.

39. A method for producing a print medium comprising the steps of:
  a) providing a substrate having a first side and a reverse side, and
  b) applying a coating composition comprising pigment particles and at least one coating binder on the first side of the substrate to form a permeable coating layer, wherein said pigment particles, when in form of a compacted bed,
  have a monomodal pore diameter distribution,
  a volume defined polydispersity expressed as full width at half maximum height (FWHM) from 40 to 80 nm, and
  a volume defined median pore diameter from 30 to 80 nm.

40. The method of claim 39, wherein the coating composition is a liquid coating composition and the method further comprises a step c) of drying the coating layer.

41. The method of claim 39, wherein steps b) and c) are also carried out on the reverse side of the substrate to manufacture a print medium being coated on the first and the reverse side.

42. The method of claim 39, wherein steps b) and c) are carried out a second time using a different or the same liquid coating composition.

43. The method of claim 39, wherein the coating composition is a dry coating composition and step b) is also carried out on the reverse side of the substrate to manufacture a print medium being coated on the first and the reverse side.

44. The method of claim 43, wherein step b) is also carried out a second time using a different or the same dry coating composition.

45. The method of claim 40, wherein the liquid coating composition used to form the coating layer has a solid content from 10 to 80 wt.-%, based on the total weight of the liquid coating composition.

46. The method of claim 40, wherein the liquid coating composition used to form the coating layer has a solid content from 30 to 75 wt.-%, based on the total weight of the liquid coating composition.

47. The method of claim 40, wherein the liquid coating composition used to form the coating layer has a solid content from 40 to 70 wt.-%, based on the total weight of the liquid coating composition.

48. The method of claim 40, wherein the liquid coating composition used to form the coating layer has a solid content from 45 to 65 wt.-%, based on the total weight of the liquid coating composition.

49. The method of claim 40, wherein the liquid coating composition has a Brookfield viscosity in the range from 20 to 3000 mPa·s.

50. The method of claim 40, wherein the liquid coating composition has a Brookfield viscosity in the range from 250 to 3000 mPa·s.

51. The method of claim 40, wherein the liquid coating composition has a Brookfield viscosity in the range from 1000 to 3000 mPa·s.

52. The method of claim 39, wherein the coating composition is applied by high speed coating, metering size press, curtain coating, spray coating, blade coating, or electrostatic coating.

53. A composition comprising pigment particles, wherein said pigment particles, when in form of a compacted bed,
  have a monomodal pore diameter distribution,
  a volume defined polydispersity expressed as full width at half maximum height (FWHM) from 40 to 80 nm, and
  a volume defined median pore diameter from 30 to 80 nm.

54. The composition of claim 53, wherein the composition is a dry or liquid coating composition.

* * * * *